US007065715B2

(12) United States Patent
Sugiyama et al.

(10) Patent No.: US 7,065,715 B2
(45) Date of Patent: Jun. 20, 2006

(54) PROCESSING DEVICE THAT MAINTAINS DISPLAY ORDER BETWEEN CORRESPONDING ITEMS IN DIFFERENT DISPLAY AREAS

(75) Inventors: Hiroki Sugiyama, Nara (JP); Masao Yamamoto, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 412 days.

(21) Appl. No.: 09/801,672

(22) Filed: Mar. 9, 2001

(65) Prior Publication Data

US 2001/0026289 A1 Oct. 4, 2001

(30) Foreign Application Priority Data

Mar. 21, 2000 (JP) .............................. 2000-078995

(51) Int. Cl.
*G06F 3/00* (2006.01)

(52) U.S. Cl. ........................ 715/838; 715/835; 715/810

(58) Field of Classification Search ................ 345/704, 345/716, 719, 730, 732, 764, 810, 830, 838, 345/968; 707/3, 102; 715/835, 838, 810
See application file for complete search history.

(56) References Cited

U.S. PATENT DOCUMENTS

| | | | | |
|---|---|---|---|---|
| 5,680,563 | A * | 10/1997 | Edelman | 715/835 |
| 5,710,604 | A * | 1/1998 | Hodson et al. | 348/717 |
| 5,751,286 | A * | 5/1998 | Barber et al. | 345/835 |
| 5,754,174 | A * | 5/1998 | Carpenter et al. | 345/810 |
| 6,167,382 | A * | 12/2000 | Sparks et al. | 705/26 |
| 6,249,281 | B1 * | 6/2001 | Chen et al. | 345/753 |
| 6,356,908 | B1 * | 3/2002 | Brown et al. | 707/10 |
| 6,415,320 | B1 * | 7/2002 | Hess et al. | 709/219 |
| 6,801,926 | B1 * | 10/2004 | Shisler et al. | 709/201 |

FOREIGN PATENT DOCUMENTS

| | | |
|---|---|---|
| JP | 4-253285 A | 9/1992 |
| JP | 5-289839 | 11/1993 |
| JP | 11-224259 A | 8/1999 |
| JP | 11-282861 | 10/1999 |
| JP | 11-316821 A | 11/1999 |
| JP | 2001-34514 | 2/2001 |

OTHER PUBLICATIONS

Japanese Patent Office Action "Translation of Notice of Reasons for Refusal", dated Mar. 29, 2005.

* cited by examiner

*Primary Examiner*—Kieu D. Vu
(74) *Attorney, Agent, or Firm*—Nixon & Vanderhye P.C.

(57) ABSTRACT

An image information processing system that displays first and second information about image information stored in the system and interlinks the first and second information, such that when the order of the first information is changed, the order of the second information is also changed, thereby simplifying various operations for the user.

28 Claims, 35 Drawing Sheets

PROCESSING DEVICE THAT MAINTAINS DISPLAY ORDER BETWEEN CORRESPONDING ITEMS IN DIFFERENT DISPLAY AREAS

FIELD OF THE INVENTION

The present invention relates to an image information processing device, an image information processing method, a program, and a recording medium for displaying first and second information about image information stored in a storage region, for example, detailed information and an identifier image respectively, in a display area provided on a display screen.

BACKGROUND OF THE INVENTION

To facilitate manipulation of image information stored in an image information storage region, conventional image information processing devices display information about the image information in a display area on a display screen of a display device.

For example, Japanese Laid-Open Patent Application No. 11-316821/1999 (Tokukaihei 11-316821; published on Nov. 16, 1999) discloses an arrangement whereby a folder tree display area and a text display area are provided on a display screen, and by selecting a folder in the folder tree display area, the information about the image information stored in the folder is displayed in the text display area.

Japanese Laid-Open Patent Application No. 4-253285/1992 (Tokukaihei 4-253285; published on Sep. 9, 1992) discloses an arrangement whereby a list of the image information stored in an image information storage region is displayed in a display area, and a scaled-down image of the image information selected from the list is displayed in the same display area.

Japanese Laid-Open Patent Application No. 11-224259/1999 (Tokukaihei 11-224259; published on Aug. 17, 1999) discloses a similar arrangement, but with an improved image information display function: two display areas are provided on a display screen so that they display the plurality of sets of image information stored in an image information storage region (1) by list showing detailed information, such as image sizes, and (2) by scaled-down (thumbnail) image, respectively.

In an arrangement where, like the preceding one, individual display areas are provided to show sets of detailed information about, and scaled-down images representing, a plurality of sets of image information, the display orders of the sets of detailed information and scaled-down images can be arbitrarily changed in the display areas by, for example, a drag-and-drop using a mouse.

However, the display order can only be changed separately in the display areas. For example, if the display order is changed only for the scaled-down images, the relationship becomes unclear between the scaled-down images and the sets of detailed information, causing confusion in later processes.

To avoid this inconvenience from happening, if the display order is changed for the scaled-down images, for example, the display order must be changed for the sets of detailed information accordingly. No conventional image information display devices have such a convenient function, and the user is hence forced to manually execute laborious operations to effect it.

SUMMARY OF THE INVENTION

The present invention, perceived to solve this problem, has an objective to present an image information processing device, an image information processing method, a program, and a recording medium capable of displaying first and second information about image information stored in a storage region, for example, detailed information and an identifier image respectively, and changing the display orders of the various kinds of displayed information with improved convenience.

To accomplish the objective, an image information processing device in accordance with the present invention includes:

a display section;

an image information storage section;

a display area providing section for providing a first display area and a second display area on the display section;

a display control section for causing first information and second information of a plurality of sets of image information stored in an image information storage region in the image information storage section to be displayed in the first and second display areas respectively; and an interlinked display control section for, when a display order of either the first information or the second information is changed on a display screen of the display section, setting a display order of the other information so that the first and second information of the plurality of sets of image information is displayed in an identical display order in the first and second display areas respectively.

In the arrangement, the display area providing section provides first and second display areas in the display section, the display control section causes the first and second information of a plurality of sets of image information stored in an image information storage region in the image information storage section to be displayed in the first and second display areas respectively. Under these circumstances, when the display order of either the first or second information is changed on the display screen of the display section by, for example, a drag-and-drop, the interlinked display control section sets the display order of the other information so that the first and second information of the plurality of sets of image information is displayed in an identical display order in the first and second display areas respectively.

As described above, the first and second information about the image information stored in the image information storage region is displayed in a manner recognizable at a glance in the respective first and second display areas on the display screen of the display section, facilitating recognition of the contents of image information. Further, if under these circumstances, the display order is changed, for example, of any kind of the first information, the display order of the second information is automatically changed according to the change. In other words, a change made to the display order of the first information is automatically reflected in the display order of the second information. Therefore, if the display order of either the first information or the second information is changed as desired by the user, the relationship between the first and second information can be maintained without the user bothering to manipulate to change the display order of the other information in line with the preceding change on the display screen. This enhances the operability of the image information processing device.

Another image information processing device in accordance with the present invention includes:

a display section;

an image information storage section;

a display control section for causing the display section to display sets of detailed information and identifier images of a plurality of sets of image information stored in an image information storage region in the image information storage section, by which identifier images at least parts of the plurality of sets of image information are identified; and interlinked display control means for, when a display order of either the detailed information and the identifier images is changed on a display screen of the display means, setting a display order of the other so that the detailed information and identifier images of the plurality of sets of image information are displayed in an identical display order in rows showing the detailed information and the identifier information respectively.

In the arrangement, the display control section causes the display section to display the sets of detailed information and identifier images of a plurality of sets of image information stored in an image information storage region in the image information storage section. Under these circumstances, when the display order of either the detailed information or the identifier images is changed on the display screen of the display section by, for example, a drag-and-drop, the interlinked display control section sets the display order of the other so that the detailed information and identifier images of the plurality of sets of image information are displayed in an identical display order.

As described above, the detailed information and identifier images of the image information stored in the image information storage region are displayed in a manner recognizable at a glance on the display section, facilitating recognition of the contents of image information. Further, if under these circumstances, the display order is changed, for example, of any kind of the detailed information, the display order of the identifier images is automatically changed according to the change. In other words, a change made to the display order of the detailed information is automatically reflected in the display order of the identifier images. Therefore, if the display order of either the detailed information or the identifier images is changed as desired by the user, the relationship between the detailed information and identifier images can be maintained without the user bothering to manipulate to change the display order of the other in line with the preceding change on the display screen. This enhances the operability of the image information processing device.

The present invention will become more fully understood from the detailed description given hereinbelow and the accompanying drawings which are given by way of illustration only, are not in any way intended to limit the scope of the claims of the present invention.

BRIEF DESCRIPTION OF THE DRAWINGS

FIG. 6(*b*) is an explanatory view showing a rearrange process executed on the scaled-down image in a manner interlinked with the rearrange manipulation of FIG. 6(*a*).

FIG. 9(*b*) is an explanatory view showing a rearrange process executed on detailed information in the detailed information display area based on the select operation of FIG. 9(*a*) and an interlinked rearrange process executed on the scaled-down images in the scaled-down image display area.

FIG. 14(*b*) is an explanatory view showing a display on the display section as a result of the process of FIG. 13 executed by the search display control section.

FIG. 16(*b*) is an explanatory view showing a display on the display section as a result of the process of FIG. 15 executed by the direct select display control section.

FIG. 19(*b*) is an explanatory view showing a display on the display section as a result of the process of FIG. 17 executed by the search display control section.

FIG. 21(*b*) is an explanatory view showing a display on the display section as a result of the process of FIG. 17 executed by the direct select display control section.

FIG. 24(*b*) is an explanatory view showing a display on the display section as a result of the process of FIG. 22 executed by the search display control section.

FIG. 26(*b*) is an explanatory view showing a display on the display section as a result of the process of FIG. 17 executed by the direct select display control section.

FIG. 29(*b*) is an explanatory view showing changes in the display on the display section as a result of a direct select display process, as compared to the display shown in FIG. 29(*a*).

FIG. 32(*b*) is an explanatory view showing a display on the display section when the second folder is selected in the foregoing operation.

FIG. 33(*b*) is an explanatory view showing a display on the display section in executing an operation to actually select the folder after the folder to be selected is specified.

FIG. 34(*b*) is an explanatory view showing an another example of the scaled-down image.

FIG. 34(*c*) is an explanatory view showing a further example of the scaled-down image.

DESCRIPTION OF THE EMBODIMENTS

The following will discuss embodiments in accordance with the present invention in reference to FIG. 1 to FIG. 35.

Figure 1:
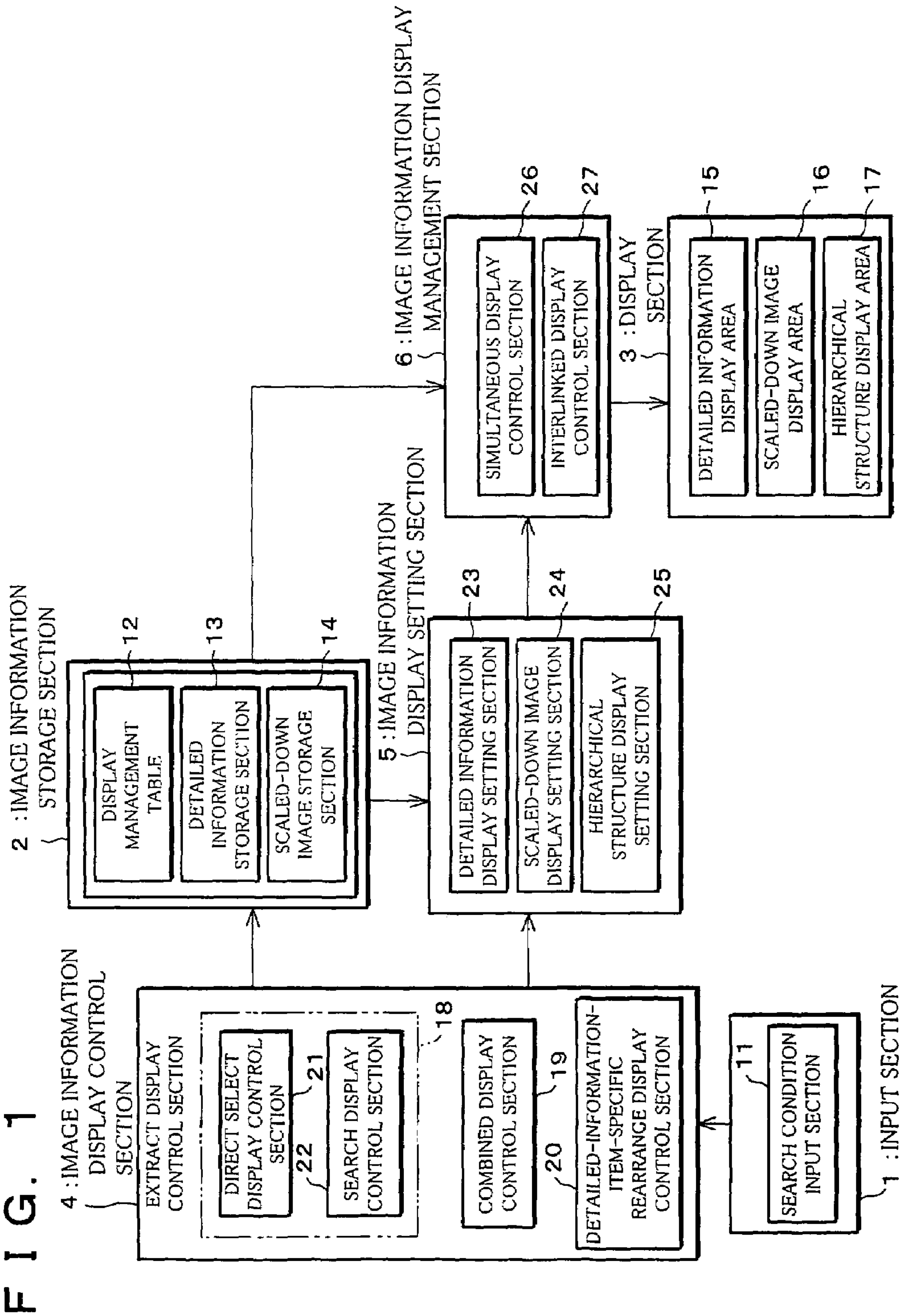
FIG. 1 is a block diagram showing an arrangement of an image information processing device of an embodiment in accordance with the present invention.

An image information processing device of the present embodiment includes, as shown in FIG. 1, an input section (input means) 1, an image information storage section (image information storage means) 2, a display section (display means) 3, an image information display control section (display control means) 4, an image information display setting section (display control means, display area providing means) 5, and an image information display management section 6.

The input section 1 is for enabling the user to inputting edit, delete, search and other process instructions on the image information to the image information processing device, and includes, for example, a search condition input section 11. The process instruction entered through the input section 1 is given to the image information display control section 4.

The image information storage section 2 includes, for example, a magneto-optical disk or another recording medium and stores a plurality of sets of image information. The image information stored in the image information storage section 2 may be, for example, scanned by a scanner (not shown), supplied from an external device through a communication network, or retrieved by a recording medium, provided in the image information processing device, to store a plurality of sets of image information.

The image information storage section 2 includes display management tables 12, a detailed information storage section 13, and a scaled-down image storage section 14. A display management table 12 is provided for each set of image information. Sets of detailed information about each set of image information are stored in the detailed information storage section 13, and the scaled-down (thumbnail) image as an identifier image is stored in the scaled-down image storage section 14.

In the display section 3 are there provided a detailed information display area (the first display area) 15, a scaled-down image display area (the second display area) 16, and a hierarchical structure display area (third display area, folder display area) 17.

The image information display control section 4 includes an extract display control section (extract display control means) 18, a combined display control section (combined display control means) 19, and a detailed-information-item-specific rearrange display control section (information-item-specific rearrange means) 20. The extract display control section 18 in turn includes a direct select display control section (direct select means) 21 and a search display control section (search means) 22.

The image information display control section 4 selects one of the control sections 18–20 which is suitable to the process instruction entered through the input section 1 and controls the image information storage section 2 and the image information display setting section 5 to execute the process.

The image information display setting section 5 includes a detailed information display setting section 23, a scaled-down image display setting section 24, and a hierarchical structure display setting section 25.

The detailed information display setting section 23 specifies a detailed information display area 15 on the display screen of the display section 3. The scaled-down image display setting section 24 specifies a scaled-down image display area 16, whereas the hierarchical structure display setting section 25 specifies a hierarchical structure display area 17.

The image information display management section 6 includes a simultaneous display control section 26 and an interlinked display control section (interlinked display control means) 27. The image information display management section 6 manages so that the image information displayed simultaneously and in an interlinked manner in the detailed information display area 15, the scaled-down image display area 16, and the hierarchical structure display area 17 through the operation by the simultaneous display control section 26 and the interlinked display control section 27 as detailed later.

Figure 2:
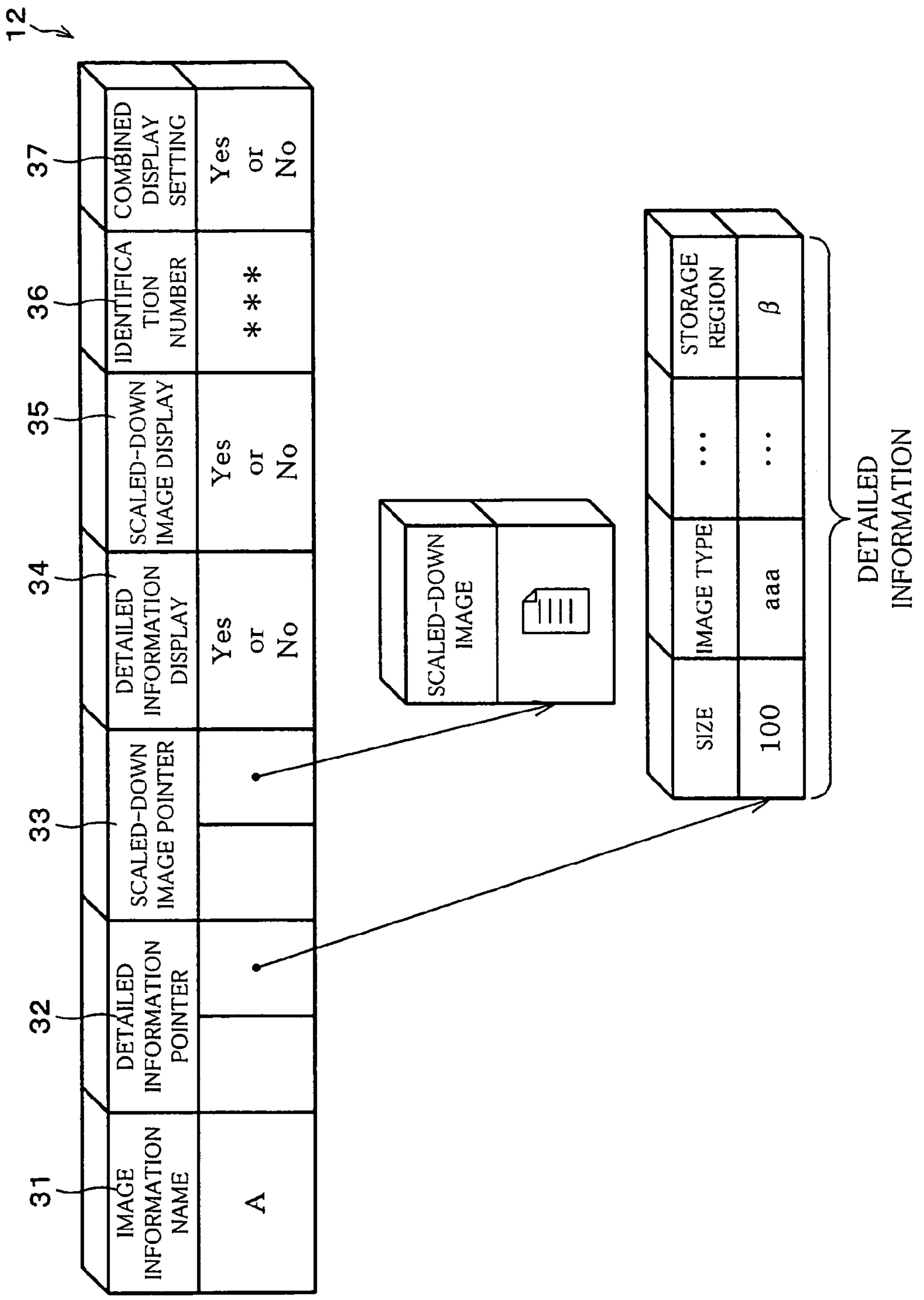
FIG. 2 is an explanatory view showing contents in the display management table of FIG. 1.

The display management table 12, corresponding to one of the sets of image data stored in the image information storage section 2, stores various kinds of information as shown in FIG. 2: namely, an image information name 31, a detailed information pointer 32, a scaled-down image pointer 33, a detailed information display setting 34, a scaled-down image display setting 35, an identification number 36, and a combined display setting 37.

The detailed information pointer 32 is a pointer referring to the detailed information storage section 13 in the image information storage section 2. The scaled-down image pointer 33 is a pointer referring to the scaled-down image storage section 14 in the image information storage section 2. As shown again in FIG. 2, an image information size, an image type, a storage region in which the image information is stored, (information about which of the image information storage regions 51 displayed in the hierarchical structure display area 17 stores the image information), and other kinds of information are specified as the detailed information.

The detailed information display setting 34 stores information about whether or not detailed information about the image information is to be displayed in the detailed information display area 15 of the display section 3. The scaled-down image display setting 35 stores information about whether or not the scaled-down image of the image information is to be displayed in the scaled-down image display area 16.

The identification number 36 indicates a display order of the plurality of sets of the image information and assigned a natural number corresponding to the display order. For example, the first set of image information to be displayed is given identification number 1, whereas the second set of image information to be displayed is given identification number 2. To generate the detailed information and scaled-down image to be displayed in the detailed information display area 15 and the scaled-down image display area 16 respectively, the sets of image information undergoes processing in the order of the identification numbers 36. The identification numbers 36 assigned to the sets of image information are successive natural numbers, and no two of them are identical.

Therefore, the image information display setting section 5 obtains the display management table 12 from the image information storage section 2 and specifies the detailed information display area 15, scaled-down image display area 16, and hierarchical structure display area 17 based on the information. The image information display management section 6 manages displays of the image information also based on the information obtained from the display management table 12.

Figure 3:
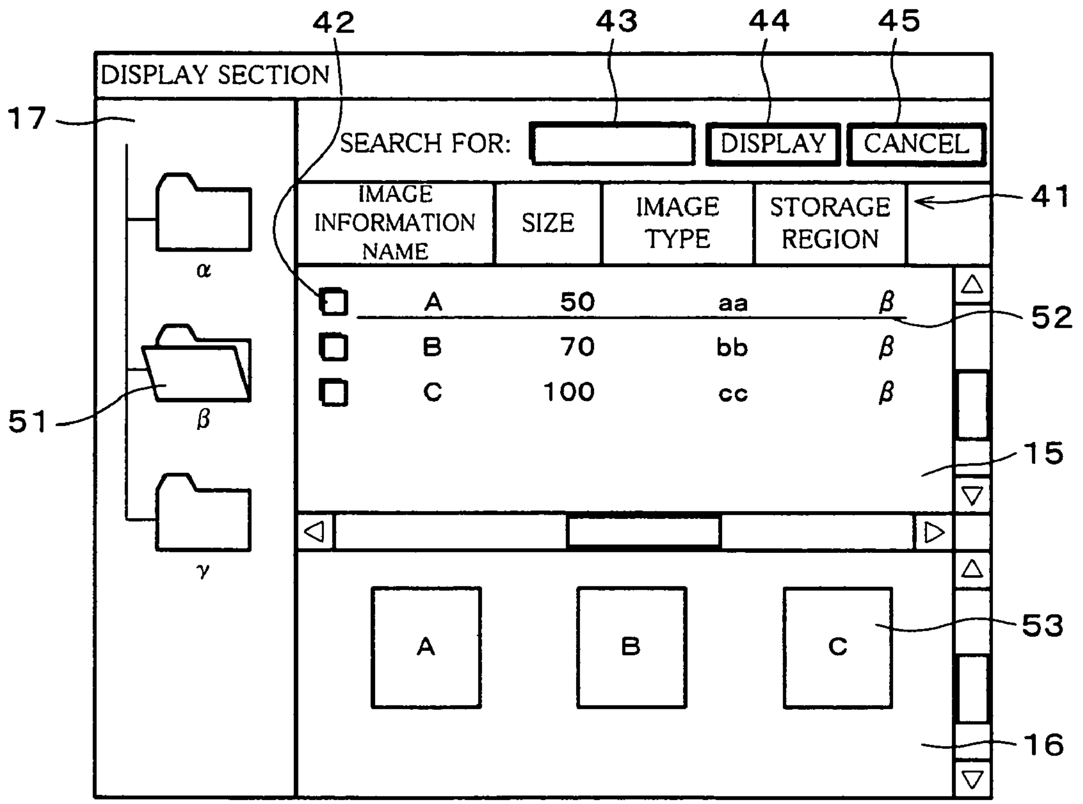
FIG. 3 is an explanatory view showing a display format of image information of the display section of FIG. 1.

The image information appears in the display section 3 in the display format shown in FIG. 3. The detailed information display area 15, scaled-down image display area 16, and hierarchical structure display area 17 are provided on the display screen of the display section 3. FIG. 3 shows that α, β, and γ, hierarchical structure image information storage regions (hereinafter, "folders") 51 appear in the hierarchical structure display area 17 with one of the folders, β folder, in which three sets of image information A, B, and C are stored.

The detailed information 52 about all the sets of image information A, B, C is displayed by list in the detailed information display area 15. The scaled-down images 53 about the sets of image information A, B, C are displayed in the scaled-down image display area 16. These sets of detailed information 52 appearing in the detailed information display area 15 and the scaled-down images 53 appearing in the scaled-down image display area 16 can be rearranged in order by, for example, a drag-and-drop with a mouse.

The detailed information item of the detailed information 52 displayed in the detailed information display area 15 are the image information name, image information size, image type, and storage region name stored in the display management table 12. The regions in which these items appear function as manipulation buttons provided by the input section 1, that is, item selection buttons 41. The item selection button 41 is manipulated when the display order of the sets of detailed information is to be changed based on the contents of the detailed information items by the processing executed by the detailed-information-item-specific rearrange display control section 20.

A check box 42 is provided in the far left position of each horizontal row constituted by detailed information items of the detailed information 52 about a set of image information. The check box 42 can be checked, for example, with a manipulation of the mouse through the input section 1 and is used to select the set of image information A, B, or C. For example, the set of image information for which the check box 42 is checked is processed by the extract display control section 18 so that the associated scaled-down image 53 is displayed in the scaled-down image display area 16. Alternatively, the check box 42 is used to specify, as what will be selected, the image information.

In the detailed information display area 15 are there further provided a search condition input box 43 in which search words are entered, a display button 44, and a cancel button 45. The cancel button 45 reverses the changes that have been made to the display order of the detailed information and scaled-down images to restore the original order.

Figure 4:
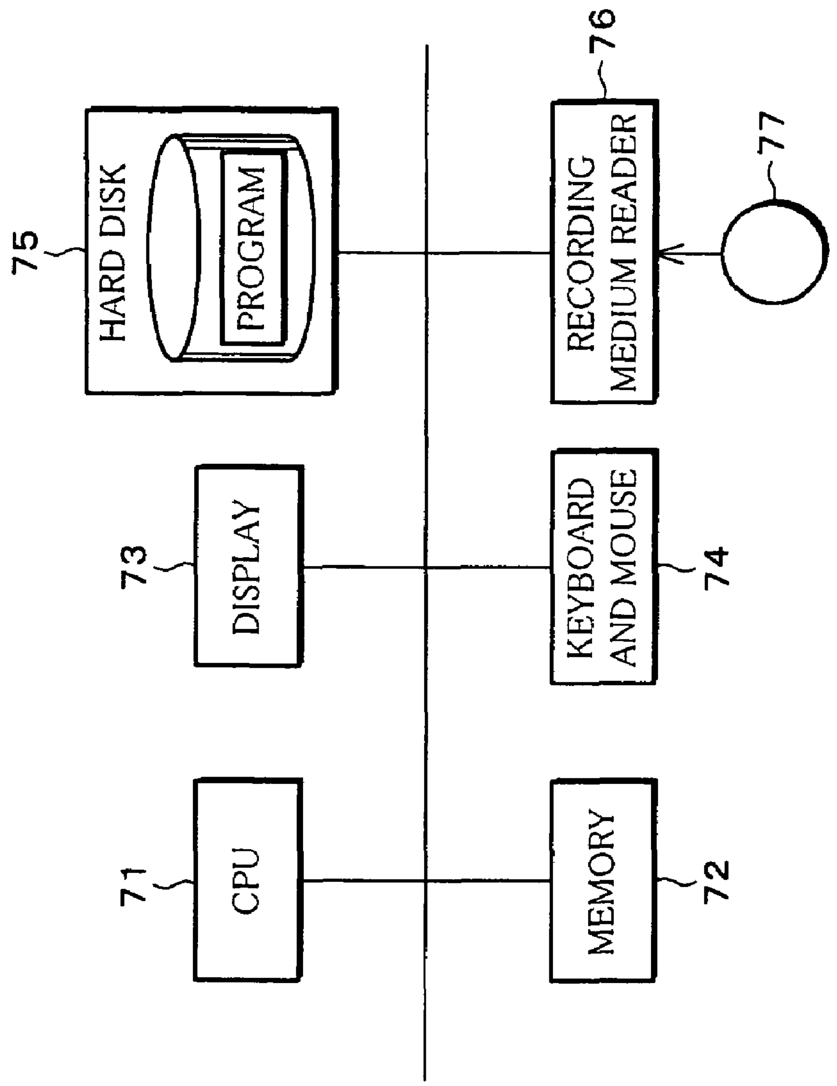
FIG. 4 is a block diagram showing the arrangement of FIG. 1 more specifically.

FIG. 4 shows, as an example, the arrangement of the image information processing device of FIG. 1 more specifically. The image information processing device of FIG. 4 includes a CPU 71, a memory 72, a display 73, a keyboard and mouse 74, a hard disk 75, a recording medium reader 76, and a recording medium 77 which are connected to the CPU 71.

The memory 72 includes, for example, a RAM and functions as an operating region for the CPU 71. The display 73 is equivalent to the display section 3, the keyboard and mouse 74 to the input section 1, and the hard disk 75 to the image information storage section 2.

The hard disk 75 stores files of execute form as computer programs to enable the image information processing device to execute processing. The computer programs may be stored on the hard disk 75 in advance. Else, they may be stored on the recording medium 77 in the first place and copied from the recording medium 77 onto the hard disk 75 through the recording medium reader 76.

In the arrangement of FIG. 4, the image information display control section 4, image information display setting section 5, and image information display management section 6 of FIG. 1 are realized by computer programs written in the CPU 71 and the hard disk 75.

Now, the operation by the image information display management section 6 in the present image information processing device arranged as above will be explained in reference to the flow chart of FIG. 5.

In the image information display management section 6, to effect the display of FIG. 3 on the display screen of the display section 3, first of all, a display management table 12 is retrieved from the image information storage section 2 (S1).

Next, the interlinked display control section 27 in the image information display management section 6 determines whether or not a change has made to the detailed information display area 15 or the scaled-down image display area 16 (S2). Specifically, it determines whether or not the display order of the detailed information 52 about the sets of image information has been changed in the detailed information display area 15 and also whether or not the display order of the scaled-down images 53 of the sets of image information has been changed in the scaled-down image display area 16. This determination of whether any change ever been made is effected for the information accompanied by each identification number of the display management table 12.

If no change is made in S2, the process proceeds to S3 where the display management table 12 stored in the image information storage section 2 with no changes, and the process completes here.

Meanwhile, if a change is made in S2, and the change is made to the detailed information display area 15 (S4), the contents of the identification number 36 in the display management table 12 are updated so that the contents of the display management table 12 match the display contents of the sets of detailed information 52 in the detailed information display area 15, i.e., the display order of the sets of detailed information 52 (S5). In this event, the identification number 36 for the set of image information of which the detailed information 52 is displayed in the first (top) position in the detailed information display area 15 is set to 1, and the identification numbers 36 of the sets of image information are assigned successive natural numbers corresponding to the display order or the detailed information 52.

Next, the identification numbers 36 in the display management tables 12 are searched for the maximum value of the identification numbers 36, i.e., the total number, X, of the sets of image information stored in the image information storage section 2 (S6).

Next, parameters N and M are both set to 1 (S7), and then it is determined in reference to the display management table 12 of the set of image information with the N-th identification number 36 whether or not the scaled-down image 53 of this set of image information is to be displayed in the scaled-down image display area 16. The determination is effected based on the setting, in the scaled-down image display setting 35 in the display management table 12, indicating whether a display is to be effected.

If it is determined in S8 that the scaled-down image 53 is to be displayed, the scaled-down image 53 of the set of image information with the N-th identification number 36 is displayed in the M-th position in the scaled-down image display area 16 (S9). Then, M is increased by 1 (M=M+1) in S10, before proceeding to S11. In contrast, if it is determined in S8 that the scaled-down image 53 is not to be displayed, the process proceeds directly to S11.

In S1, it is determined whether or not the determination in S8 has been made for all the identification numbers 36. If not, N is increased by 1 (N=N+1) in S12, and steps S8–S12 are repeated until the determination is made for all the identification numbers 36, i.e., all the sets of image information.

Thereafter, when the determination is completed for all the sets of image information, the display management tables 12 are saved to the image information storage section 2 to complete the process (S3).

Meanwhile, if a change is made to the scaled-down image display area 16 in S4, the process proceeds to S13.

In S13, the contents of the identification number 36 in the display management table 12 are updated so that the contents of the display management table 12 match the display contents of the scaled-down images 53 in the scaled-down image display area 16, i.e., the display order of the scaled-down images 53. In this event, similarly, the identification number 36 for the set of image information of which the scaled-down image 53 is displayed in the first position in the scaled-down image display area 16 is set to 1, and the identification numbers 36 of the sets of image information are assigned successive natural numbers corresponding to the display order or the scaled-down images 53.

Next, the identification numbers 36 in the display management tables 12 are searched for the maximum value of the identification numbers 36, i.e., the total number, X, of the sets of image information stored in the image information storage section 2 (S14).

Next, parameters N and M are both set to 1 (S15), and then it is determined in reference to the display management table 12 of the set of image information with the N-th identification number 36 whether or not the detailed information 52 about this set of image information is to be displayed in the detailed information display area 15. The determination is effected based on the setting, in the detailed information display setting 34 in the display management table 12, indicating whether a display is to be effected.

If it is determined in S16 that the detailed information 52 is to be displayed, the detailed information 52 about the set of image information with the N-th identification number 36 is displayed in the M-th position in the detailed information display area 15 (S17). Then, M is increased by 1 (M=M+1) in S18, before proceeding to S19. In contrast, if it is determined in S16 that the detailed information 52 is not to be displayed, the process proceeds directly to S19.

In S19, it is determined whether or not the determination in S16 has been made for all the identification numbers 36. If not, N is increased by 1 (N=N+1) in S20, and steps S16–S20 are repeated until the determination is made for all the identification numbers 36, i.e., all the sets of image information.

Thereafter, when the determination is completed for all the sets of image information, the display management tables 12 are saved to the image information storage section 2 to complete the process (S3).

Figure 6A:
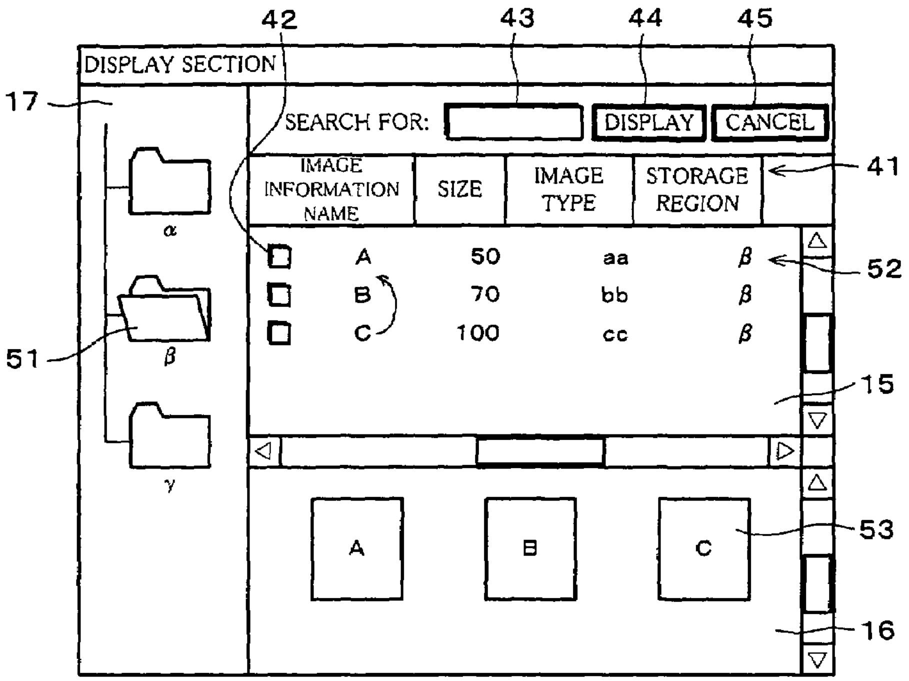
FIG. 6(*a*) is an explanatory view showing a rearrange manipulation performed by the operator on the detailed information in the interlinked display process of FIG. 5.
Figure 6B:
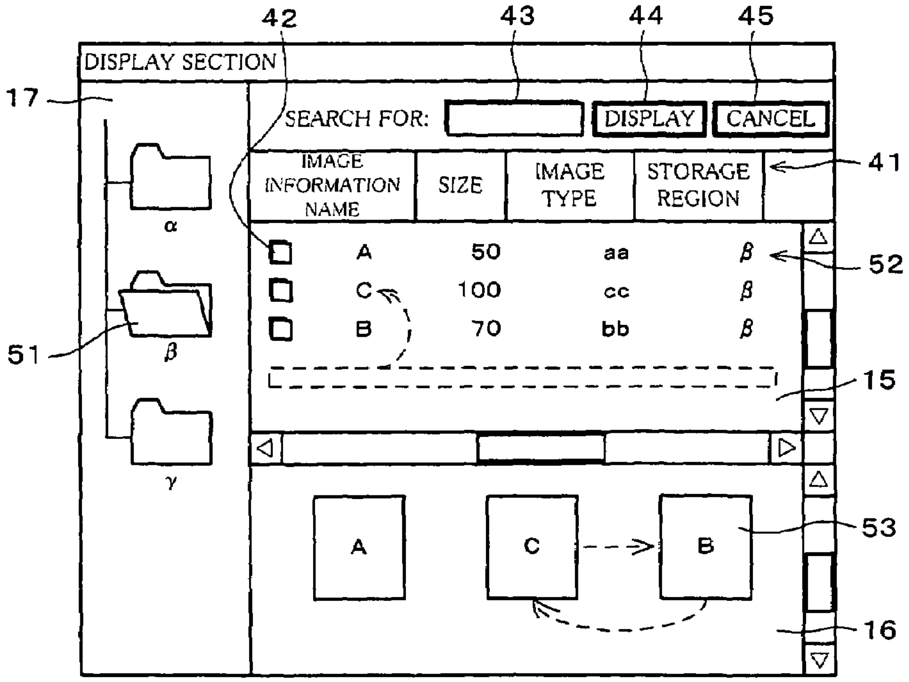

The foregoing control operation by the image information display management section 6 effects the interlinked display of the detailed information display area 15 and the scaled-down image display area 16 on the display screen of the display section 3, as an example is shown in FIGS. 6(*a*) and 6(*b*). Specifically, referring to FIG. 6(*a*) as an example where it is assumed that the display section 3 is effecting an identical display to that of FIG. 3, if in the detailed information display area 15, the detailed information 52 about the set of image information C is interposed between that of the set of image information A and that of the set of image information B by, for example, a drag-and-drop, an interlinked display is effected in the scaled-down image display area 16 in response to the scaled-down image 53(C) automatically interposing the image information C between the scaled-down image 53(A) and the scaled-down image 53(B) as shown in FIG. 6(*b*).

As in the foregoing, the image information display management section 6 manages, through its control operation, the display order of the sets of detailed information 52 in the detailed information display area 15 and the display order of the scaled-down images 53 in the scaled-down image display area 16, using a single display management table 12 for a single set of image information. This enables an interlinked display of the detailed information 52 in the detailed information display area 15 and the scaled-down images 53 in the scaled-down image display area 16. In other words, if the display order is changed either for the detailed information 52 in the detailed information display area 15 or for the scaled-down images 53 in the scaled-down image display area 16, the other display order changes automatically in an interlinked manner.

Alternatively, on the display screen of the display section 3, if either the detailed information 52 in the detailed information display area 15 or the scaled-down images 53 in the scaled-down image display area 16 is provided by the operation of the input section 1, the display color of that information may change (for example, displayed in reverse video), and the display color of the associated, other information and the folder 51 storing that information shown in the hierarchical structure display area 17 may change similarly (for example, displayed in reverse video). The process is effected by, for example, the interlinked display control section 27.

Figure 7:
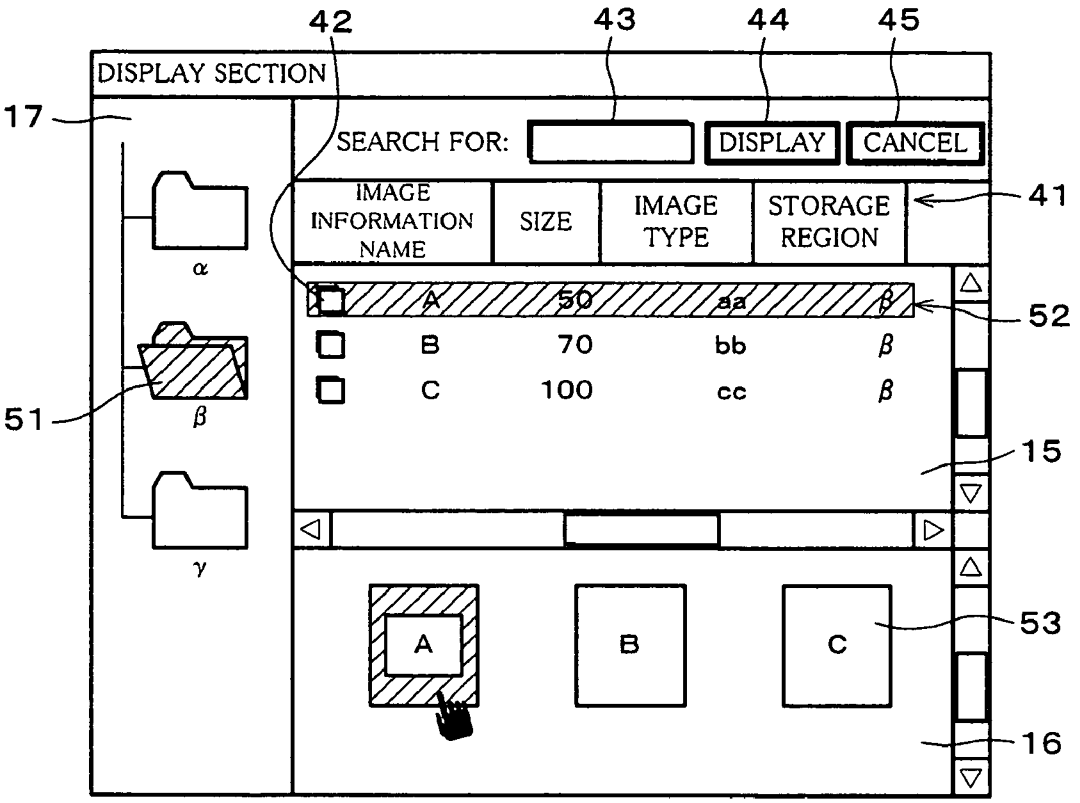
FIG. 7 is an explanatory view showing a display color inversion process executed on a specified set of detailed information, scaled-down image, and folder.

FIG. 7 illustrates such an operation, showing that when the scaled-down image 53(A) of the set of image information A is specified in the scaled-down image display area 16, the scaled-down image 53(A) is displayed in reverse video, as well as the detailed information 52 corresponding to the scaled-down image 53(A) is displayed in reverse video in the detailed information display area 15, and the folder 51(β) in which the set of image information A is stored is displayed in reverse video in the hierarchical structure display area 17.

With the arrangement, the folder 51, the detailed information 52, and the scaled-down image 53 appear in the hierarchical structure display area 17, the detailed information display area 15, and the scaled-down image display area 16 respectively in relation to the specified image information in such a visually readily recognizable manner that the use can easily understand the relationship among them.

Next, a rearrange process will be explained of the detailed information items of the detailed information 52 appearing in the detailed information display area 15. The process is executed by the detailed-information-item-specific rearrange display control section 20 in the image information display control section 4. The detailed information items displayed in the detailed information display area 15 are provided by the detailed information display setting section 23.

Figure 8:
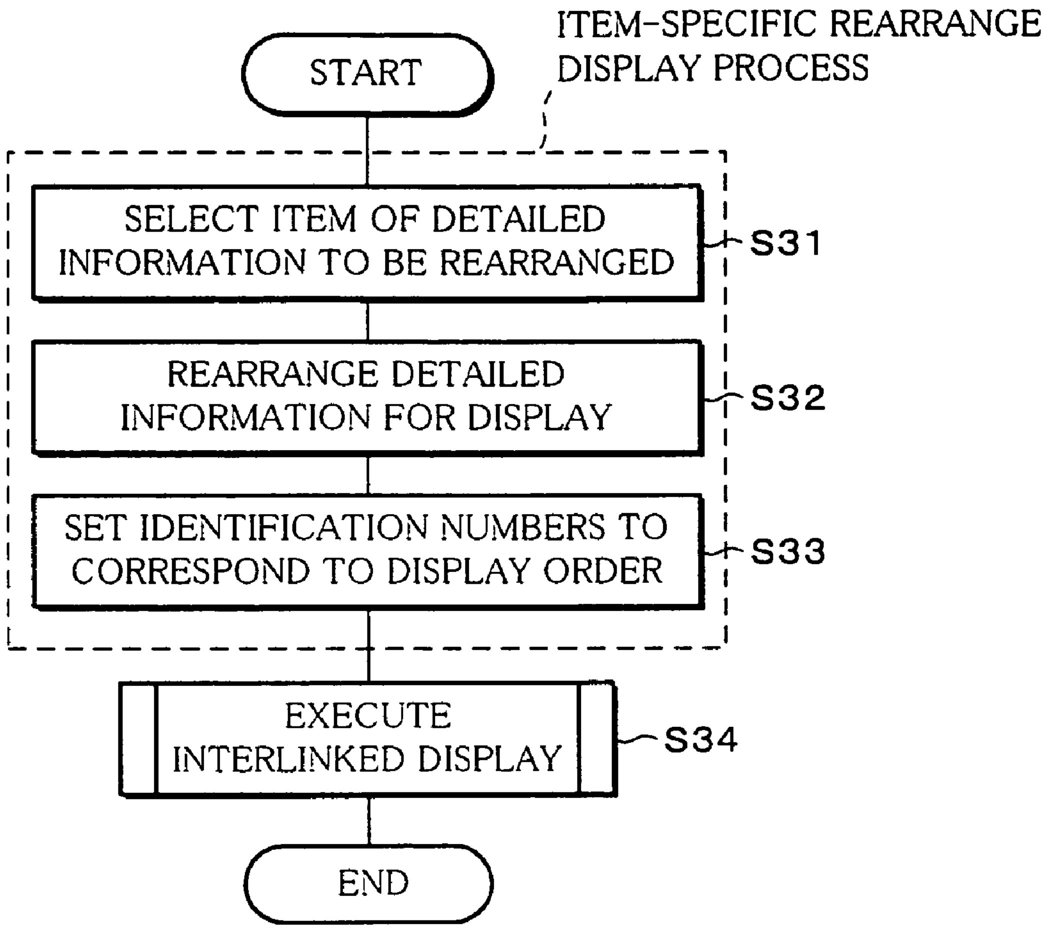
FIG. 8 is a flow chart showing an operation executed by the detailed-information-item-specific rearrange display control section of FIG. 1.

In the process, as shown in FIG. 8, first, an item is selected from the detailed information items in the detailed information 52 through manipulation of the item selection button 41 (S31). The selection of a detailed information item in this case is done by the user selecting one of the detailed information items when the sets of detailed information 52 is to be rearranged based on the contents of that detailed information item.

Next, the detailed-information-item-specific rearrange display control section 20 rearranges the sets of detailed information 52 with a conventional item-specific rearrange control method based on the contents of the detailed information item selected in S31 and display the result (S32). In the process, for example, when the image information size is selected as the detailed information item, the image information size is compared among the sets of image information A, B, and C, and the sets of detailed information 52 are rearranged and listed in descending or ascending order by image information size.

Next, the detailed-information-item-specific rearrange display control section 20 sets the identification numbers 36 of the sets of image information A, B, and C in the display management tables 12 to correspond to the display order of the detailed information 52 in the detailed information display area 15 (S33).

Figure 5:
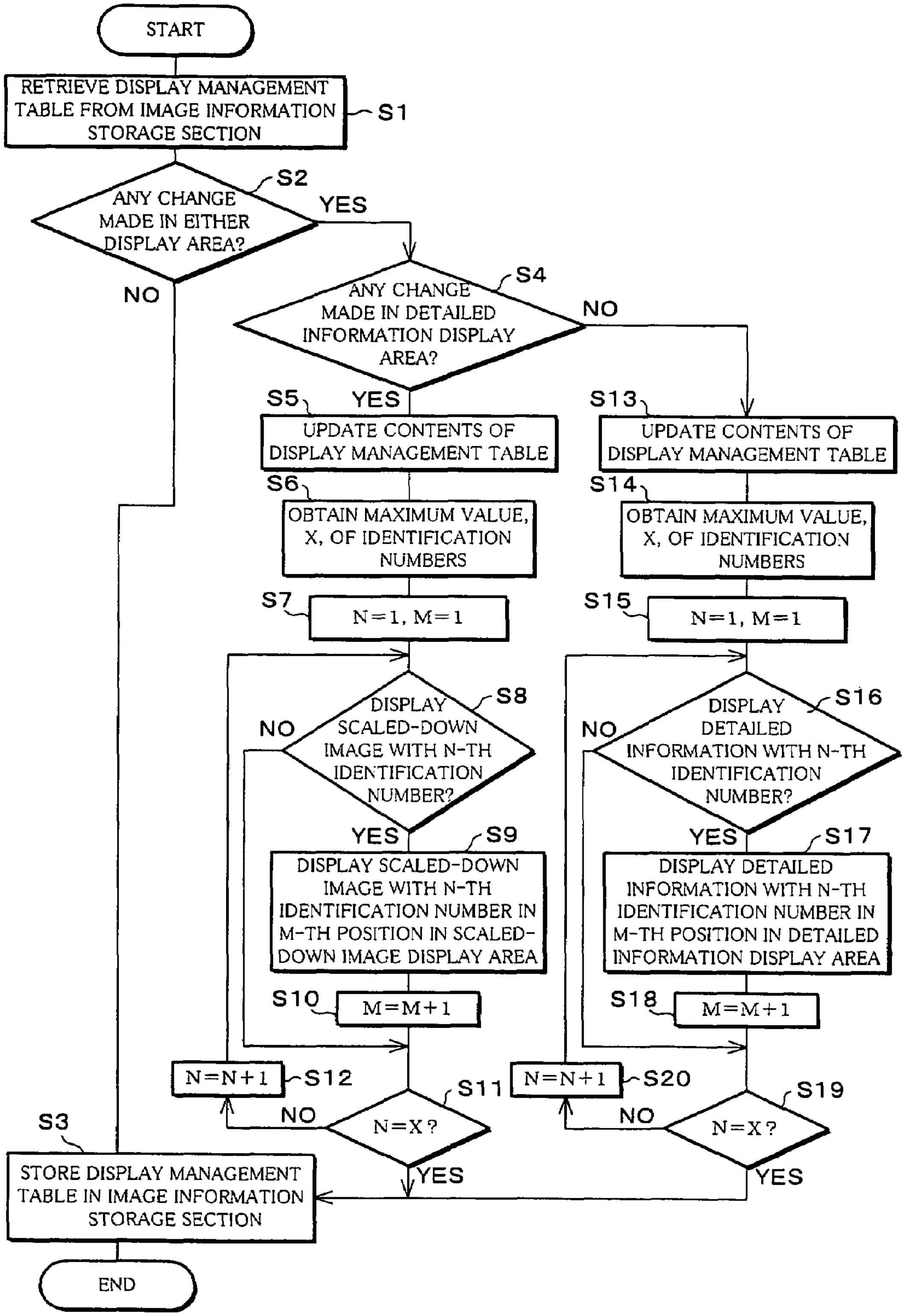
FIG. 5 is a flow chart showing an interlinked display process executed by the image information display management section of FIG. 1 on the detailed information shown in a detailed information display area and the scaled-down image shown in a scaled-down image display area.

Thereafter, when changes are effected completely in the detailed information display area 15, the image information display management section 6 executes an interlinked display process on the detailed information 52 and scaled-down images 53 according to the procedures shown in FIG. 5 (S34).

Figure 9A:
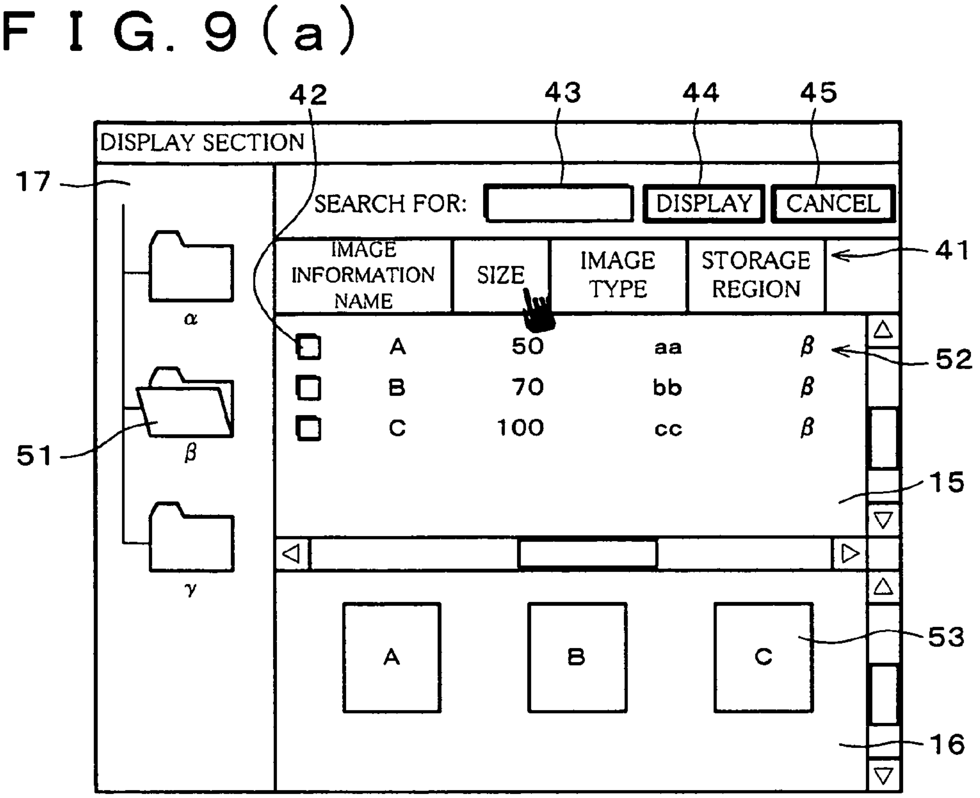
FIG. 9(*a*) is an explanatory view showing a select operation performed by the operator on a detailed information item in the detailed-information-item-specific rearrange process of FIG. 8.
Figure 9B:
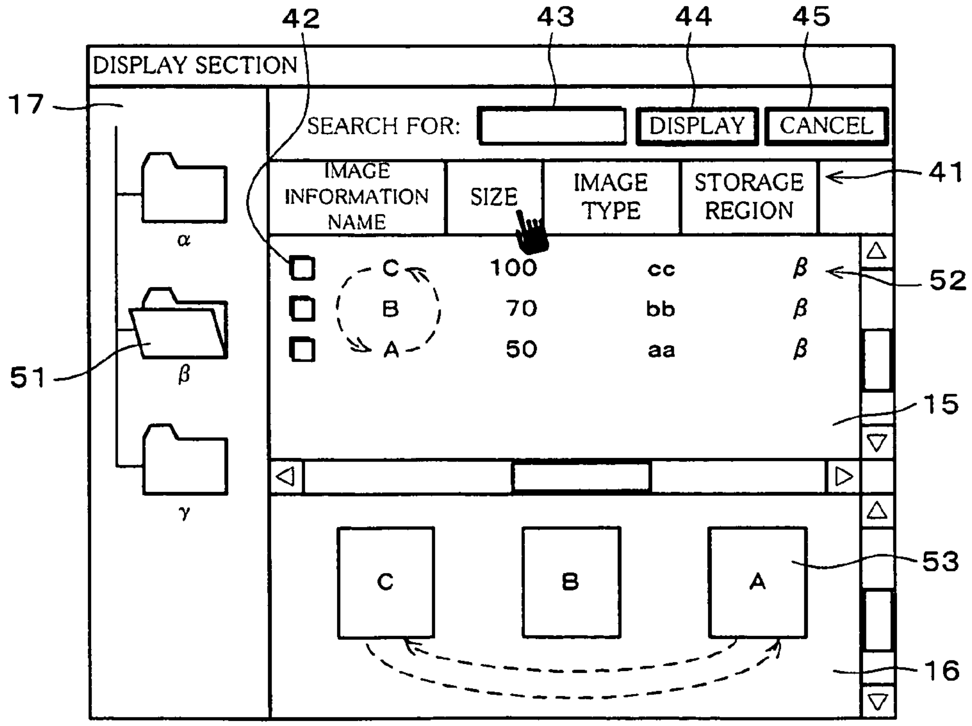

By the foregoing control operation of the detailed-information-item-specific rearrange display control section 20 and the image information display management section 6, on the display screen of the display section 3, the detailed information 52 is subjected to a rearrange operation in the detailed information display area 15 as shown in FIG. 9(*a*) and displayed in the scaled-down image display area 16 in an interlinked manner with the detailed information display area 15 as shown in FIG. 9(*b*).

In other words, as shown in FIG. 9(*a*), in the detailed information display area 15, for example, image information sizes are displayed as the detailed information item, showing that the image information sizes of the sets of image information A, B, and C are 50, 70, and 100 respectively. When the sets of detailed information 52 are to be rearranged and listed in descending order by image information size, by manipulating the size button in the item selection button 41 through the input section 1, those sets of detailed information 52 are rearranged and listed in descending order by image information size as shown in FIG. 9(*b*).

Further, interlinked with the rearrange process in the detailed information display area 15, the scaled-down images 53 in the scaled-down image display area 16 are rearranged in the same display order as that of the corresponding sets of detailed information 52 in the detailed information display area 15.

If the size button is manipulated again in FIG. 9(*b*), the sets of detailed information 52 are rearranged and listed in ascending order by image information size. As interlinked with this, the scaled-down images 53 are rearranged and listed in the same display order as that of the corresponding sets of detailed information 52.

Next, the operation of the extract display control section 18 in the image information display control section 4 of FIG. 1 will be explained in reference to the flow chart of FIG. 10. The image information processing device, as mentioned earlier, not only displays the detailed information 52 and scaled-down images 53 about all the sets of image information stored in the selected folder 51 in the detailed information display area 15 and scaled-down image display area 16, but can also display the detailed information 52 and scaled-down images 53 in various formats by the operation of the extract display control section 18 based on an extraction result under predetermined conditions.

The following will first explain the operation of the extract display control section 18 when the detailed information 52 is displayed of all the sets of image information stored in the selected folder 51 and the scaled-down images 53 are displayed according to an extraction result.

The extract display control section 18, first, retrieves a display management table 12 from the image information storage section 2 (S41).

Next, it is determined in S42 whether or not the current setting is such that the scaled-down images 53 of all the sets of image information of which the detailed information 52 is displayed in the detailed information display area 15 would be displayed in the scaled-down image display area 16.

If it is determined in S42 that the setting is such that the scaled-down images 53 of all the sets of image information would be displayed, the process proceeds to S43 where the scaled-down image display setting 35 in the display management table 12 is set to "YES" so that the scaled-down images 53 of all the sets of image information would be displayed in the detailed information display area 15.

Then, the display management tables 12 are saved to the image information storage section 2 (S44). Thereafter, the interlinked display control section 27 in the image information display management section 6 executes an interlinked display process according to the procedures shown in the flow chart FIG. 5 (S45), which completes the process.

In contrast, if it is determined in S42 that the setting is such that the scaled-down images 53 of all the sets of image information would not be displayed, it is determined whether the direct select display control section 21 or the search display control section 22 is selected as the extract means for extracting a scaled-down image 53 to be displayed (S46).

Figure 11:
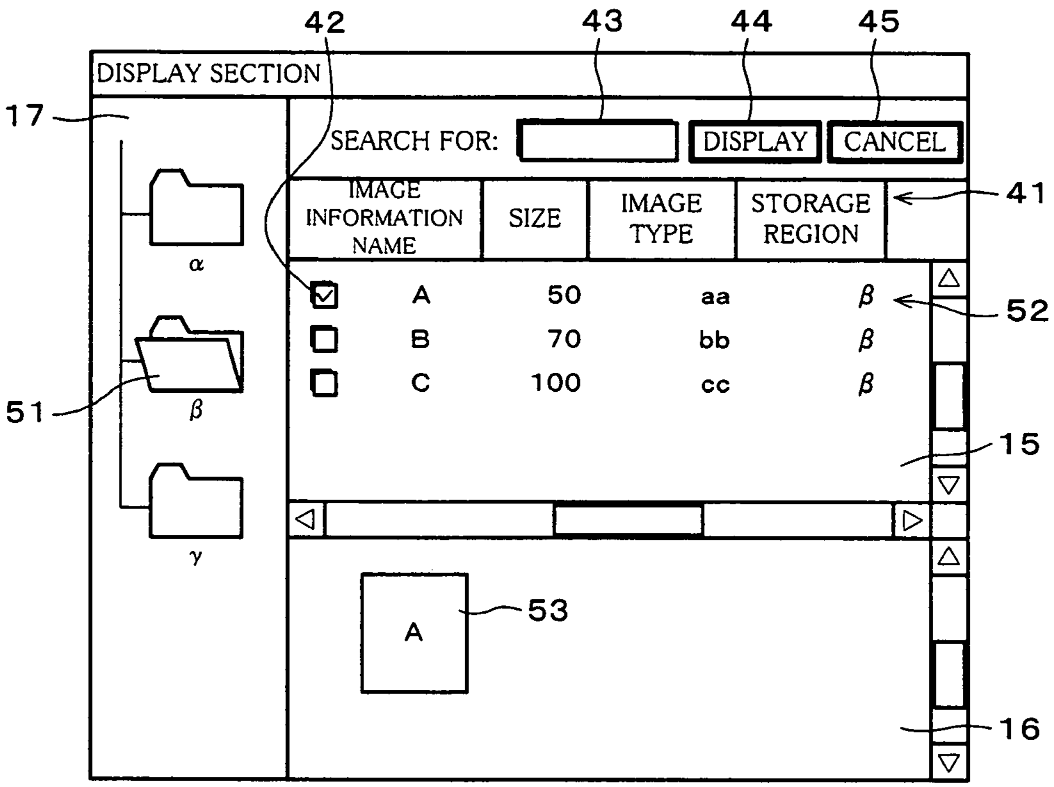
FIG. 11 is an explanatory view showing a display on the display section in the direct select display process of FIG. 10.
Figure 12:
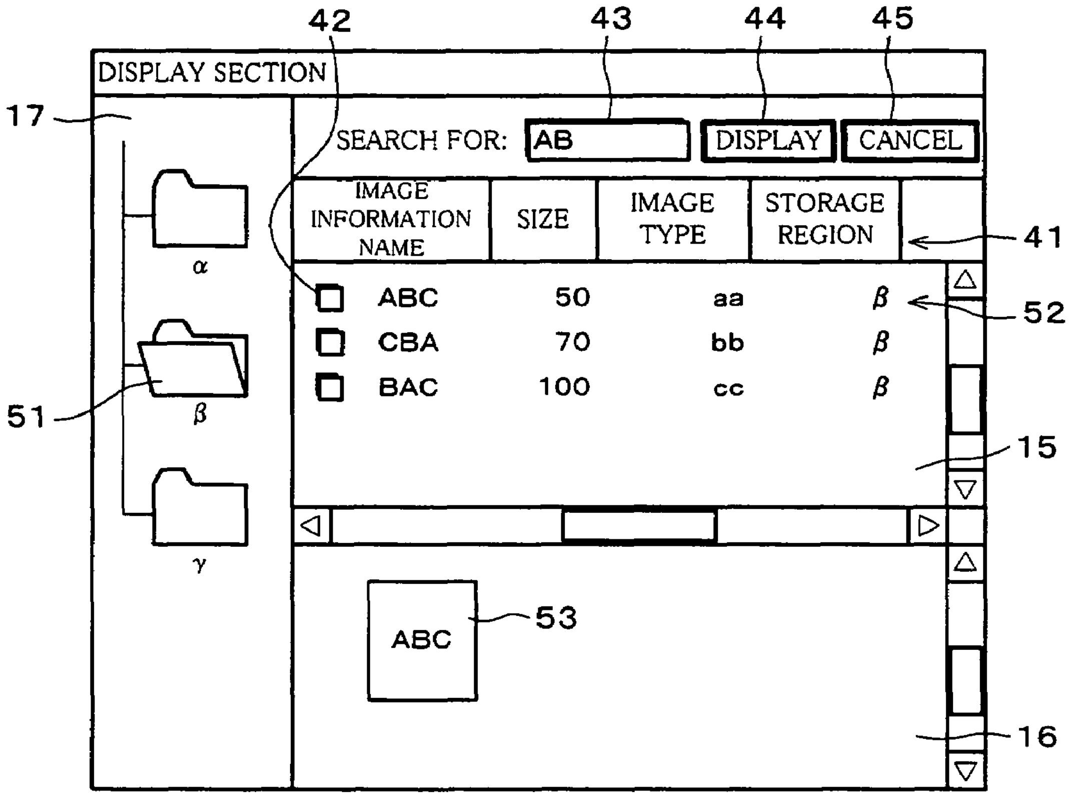
FIG. 12 is an explanatory view showing a display on the display section in the search display process of FIG. 10.

Here, the direct select display control section 21, as shown in FIG. 11, extracts a scaled-down image 53 of a set of image information for which the check box 42 is checked, whereas the search display control section 22, as shown in FIG. 12, extracts a scaled-down image 53 based on the search conditions entered in the search condition input box 43.

If it is determined in S46 that the direct select display control section 21 is selected, i.e., the check box 42 is checked, the maximum value of the identification numbers 36 in the display management tables 12, i.e., the total number, X, of the sets of image information stored in the selected folder 51 is obtained (S47).

Next, parameter N is set to 1 (S48), the data of the set of image information with the N-th identification number 36 is retrieved (S49), and it is determined whether or not the associated check box 42 is checked (S50).

If it is determined in the step that the check box 42 is not checked for the image information, the scaled-down image display setting 35 in the display management table 12 is set to "NO" so that the scaled-down image 53 of that image information would not be displayed in the detailed information display area 15 (S51), and the process proceeds to S53.

In contrast, if it is determined in S50 that the check box 42 is checked, the scaled-down image display setting 35 in the display management table 12 is set to "YES" (S52) so that the scaled-down image 53 of that image information would be displayed in the detailed information display area 15, and the process proceeds to S53.

In S53, it is determined whether or not N=X, i.e., all the sets of image information have been processed. If not all the sets of image information have been processed, N is increased by 1 (N=N+1) in S54, and steps S49–S54 are repeated.

Once all the sets of image information have been processed, the display management tables 12 are saved to the image information storage section 2 (S55). Steps S47–S55 above are part of the direct select display process.

Thereafter, the interlinked display control section 27 in the image information display management section 6 executes an interlinked display process according to the procedures shown in the flow chart of FIG. 5 (S45), which completes the process.

If it is determined in S46 that the search display control section 22 is selected, the operator enters search conditions in the search condition input box 43 through the search condition input section 11 in the input section 1 (S56). Thereafter, the maximum value of the identification numbers 36 in the display management tables 12, i.e., the total number, X, of the sets of image information stored in the selected folder 51 is obtained (S57).

Next, parameter N is set to 1 (S58), the data of the set of image information with the N-th identification number 36 is retrieved (S59), and it is determined whether or not the set of image information satisfies the search conditions (S60).

If it is determined in the step that the search conditions are not satisfied, the scaled-down image display setting 35 in the display management table 12 is set to "NO" (S61) so that the scaled-down image 53 of that image information would not be displayed in the scaled-down image display area 16, and the process proceeds to S63.

In contrast, if it is determined in S60 that the search conditions are satisfied, the scaled-down image display setting 35 in the display management table 12 is set to "YES" (S62) so that the scaled-down image 53 of that image information would be displayed in the scaled-down image display area 16, and the process proceeds to S63.

In S63, it is determined whether or not N=X, i.e., all the sets of image information have been processed. If not all the sets of image information have been processed, N is increased by 1 (N=N+1) in S64, and steps S59–S64 are repeated.

Once all the sets of image information have been processed, the display management tables 12 are saved to the image information storage section 2 (S55). Steps S56–S65 above are part of the search display process.

Thereafter, the interlinked display control section 27 in the image information display management section 6 executes an interlinked display process according to the procedures shown in the flow chart of FIG. 5 (S45), which completes the process.

By the direct select display process executed by the direct select display control section 21 in the extract display control section 18 and the control operation executed by the interlinked display control section 27 in the foregoing manner, the display section 3 displays, for example, as shown in FIG. 11. In other words, by checking, for example, only the check box 42 for the detailed information 52(A) (the detailed information 52 about the set of image information A) among those provided in the left positions in the rows showing the sets of detailed information 52 in the detailed information display area 15 and manipulating the display button 44, only the scaled-down image 53(A) (the scaled-down image 53 of the set of image information A) is extracted and displayed in the scaled-down image display area 16.

Further, by the search display process executed by the search display control section 22 in the extract display control section 18 and the control operation executed by the interlinked display control section 27, the display section 3 displays, for example, as shown in FIG. 12. Here, FIG. 12 shows a case where sets of image information ABC, CBA, and BAC are stored under the image information names of "ABC", "CBA", and "BAC" in the selected folder 51(β) in the hierarchical structure display area 17. Therefore, the detailed information 52 about these sets of image information ABC, CBA, BAC is displayed in the detailed information display area 15. Meanwhile, by entering, for example, "AB" in the search condition input box 43 as search conditions and manipulating the display button 44, only the scaled-down image 53 (ABC) of the set of image information ABC whose name includes the string of characters "AB" is extracted and displayed in the scaled-down image display area 16.

In the foregoing arrangement, all the detailed information 52 about the image information stored in the selected folder 51 is displayed in the detailed information display area 15, whereas only the scaled-down image 53 which is selected either directly or through a search is displayed in the scaled-down image display area 16. Therefore, on the display screen, the scaled-down image of the selected image information can be easily found.

Next, another operation executed by the extract display control section 18 will be explained. Here, the detailed information 52 about all the image information stored in the selected folder 51 will be displayed, and the set of the detailed information 52 selected either directly or through a search will be displayed in or near the first position in the rows showing the detailed information 52 (top position on the display screen) is displayed. Meanwhile, only the scaled-down image 53 selected either directly or through a search will be displayed. Note the scaled-down image 53 will be displayed in or near the first position (near the left end of the display screen) in the rows showing the scaled-down images 53.

First, a search display process executed by the search display control section 22 will be explained in reference to the flow chart of FIG. 13. The process can be executed in place of the search display process of FIG. 10.

In the process, once the operator enters search conditions in the search condition input box 43 through the search condition input section 11 in the input section 1 (S71), the search display control section 22 obtains the maximum value of the identification numbers 36 in the display management tables 12, i.e., the total number, X, of the sets of image information stored in the selected folder 51 (S72).

Next, parameter N is set to 1 (S73), the data of the set of image information with the N-th identification number 36 is retrieved (S74), and it is determined whether or not the set of image information satisfies the search conditions (S75).

If it is determined in the step that the search conditions are not satisfied, the scaled-down image display setting 35 in the display management table 12 is set to "NO" (S76) so that the scaled-down image 53 of that image information would not be displayed in the scaled-down image display area 16, and the process proceeds to S78.

In contrast, if it is determined in S75 that the search conditions are satisfied, the scaled-down image display setting 35 in the display management table 12 is set to "YES" (S77) so that the scaled-down image 53 of that image information would be displayed in the scaled-down image display area 16, and the process proceeds to S78.

In S78, the detailed information 52 is rearranged so that the detailed information 52 about the image information satisfying the search conditions is displayed in the top position on the display screen, whereas the detailed information 52 about the image information not satisfying search conditions is displayed in bottom positions on the display screen.

Next, it is determined whether N=X, i.e., all the sets of image information have been processed (S79). If not all the sets of image information have been processed, N is increased by 1 (N=N+1) in (S80), and steps S74–S80 are repeated. Once all the sets of image information have been processed, the display management table 12 is saved to the image information storage section 2 (S81).

Figure 14A:
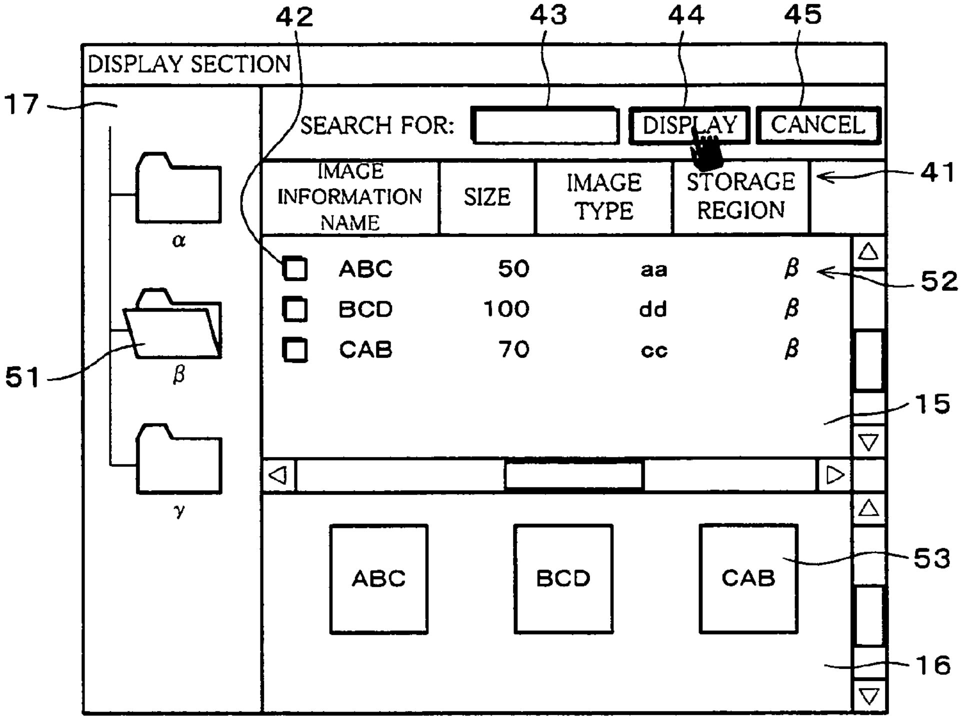
FIG. 14(*a*) is an explanatory view showing a display on the display section as a result of an ordinary interlinked display operation executed by the interlinked display control section of FIG. 1.
Figure 14B:
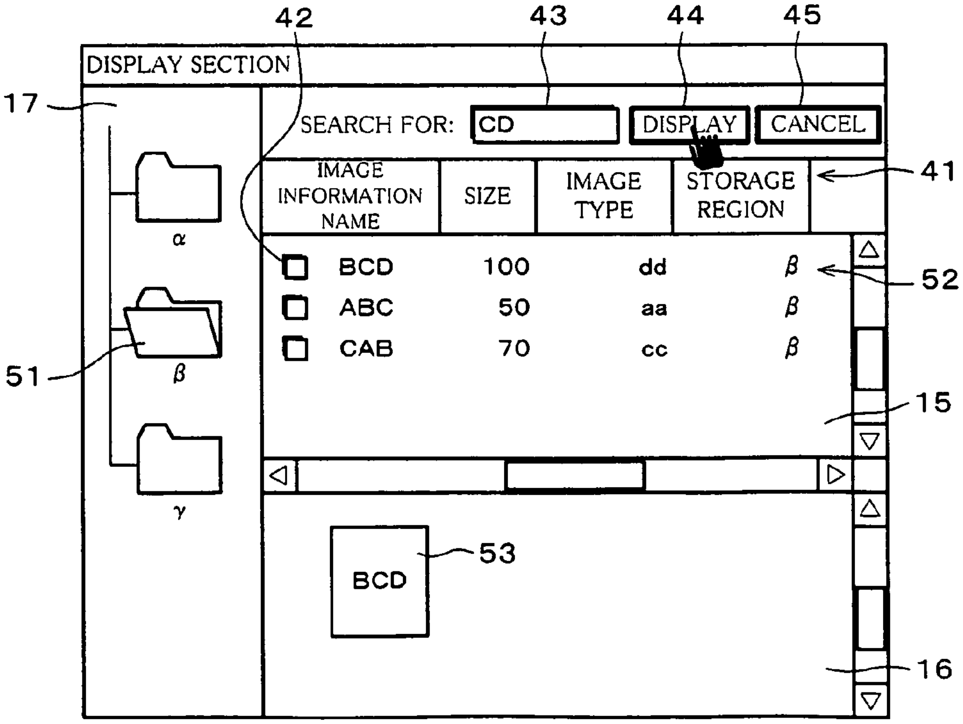

As detailed above, by the search display process executed by the search display control section 22 in the extract display control section 18 and the control operation executed by the interlinked display control section 27, the display section 3 effects, for example, an interlinked display of FIG. 14(*b*) with respect to an ordinary interlinked display of FIG. 14(*a*).

In other words, according to the ordinary interlinked display effected by the interlinked display control section 27, the detailed information 52 and scaled-down images 53 of the sets of image information ABC, BCA, and CAB stored in the selected folder 51(β) shown in the hierarchical structure display area 17 are displayed in the detailed information display area 15 and the scaled-down image display area 16 respectively as shown in FIG. 14(*a*).

Figure 13:
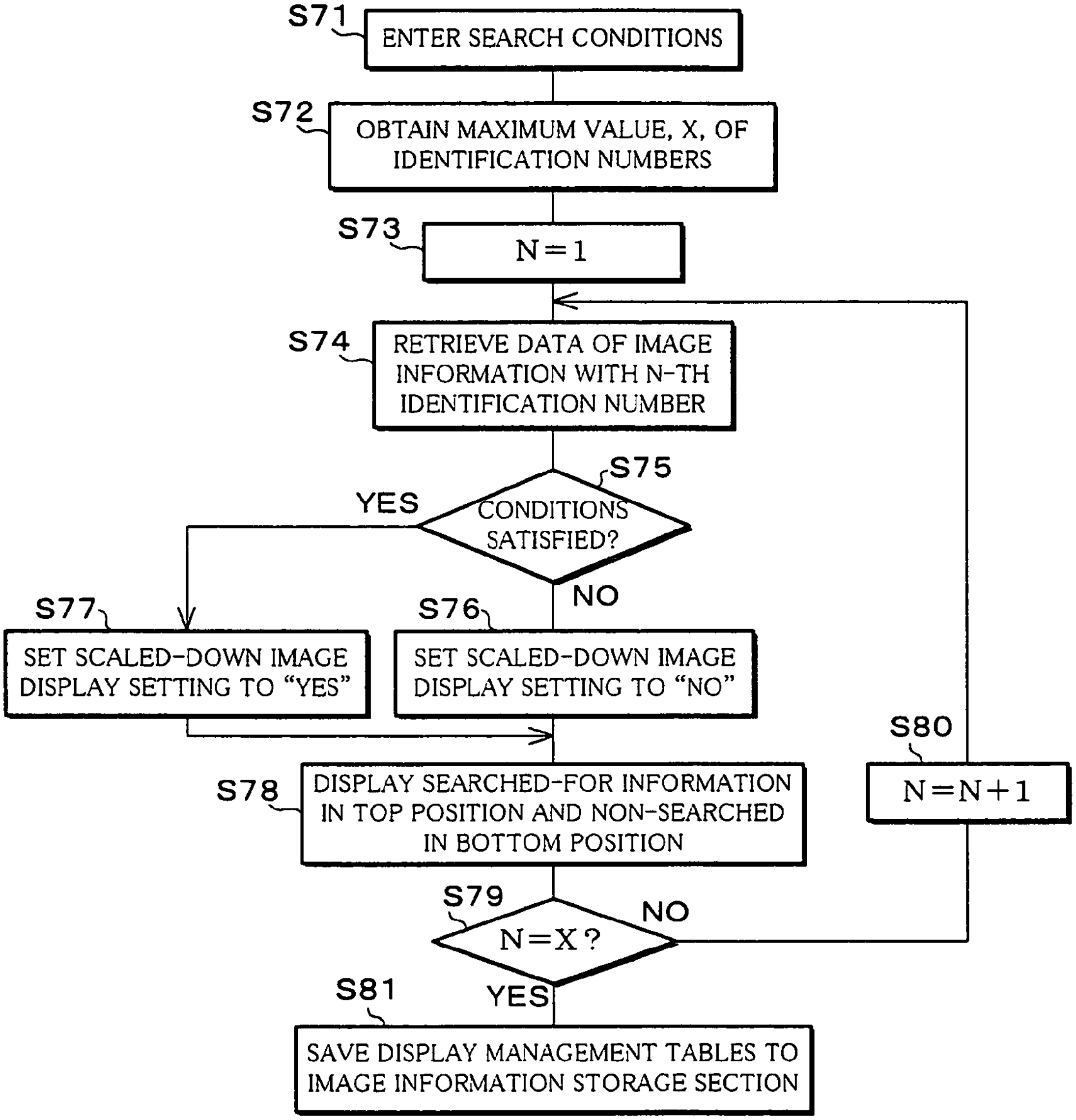
FIG. 13 is a flow chart showing, as another example, a search display process executed by the search display control section of FIG. 1.

Meanwhile, according to the search display process of FIG. 13, by entering, for example, "CD" in the search condition input box 43 as search conditions and manipulating the display button 44 as shown in FIG. 14(*b*), the detailed information 52 about all the sets of image information ABC, BCD, CAB is displayed in the detailed information display area 15; the detailed information 52(BCD) about the set of image information BCD satisfying the search conditions "CD" is displayed in the top position on the display screen, whereas the detailed information 52(ABC) and 52(CAB) about the other sets of image information ABC and CAB are displayed in the bottom positions on the display screen. In the scaled-down image display area 16, only the scaled-down image 53 of the set of image information BCD satisfying the search conditions "CD" is extracted and displayed in the first position.

Next, a direct select display process executed by the direct select display control section 21 and corresponding to the search display process of FIG. 13 will be explained in reference to the flow chart of FIG. 15. The process can be executed in place of the direct select display process of FIG. 10.

In the process, the direct select display control section 21 obtains the maximum value of the identification numbers 36 in the display management tables 12, i.e., the total number, X, of the sets of image information stored in the selected folder 51 (S91).

Next, parameter N is set to 1 (S92), the data of the set of image information with the N-th identification number 36 is retrieved (S93), and it is determined whether or not the check box 42 is checked (S94).

If it is determined in the step that the check box 42 is not checked for the image information, the scaled-down image display setting 35 in the display management table 12 is set to "NO" (S95) so that the scaled-down image 53 of that image information would not be displayed in the scaled-down image display area 16, and the process proceeds to S97.

In contrast, if it is determined in S94 that the check box 42 is checked, the scaled-down image display setting 35 in the display management table 12 is set to "YES" (S96) so that the scaled-down image 53 of that image information would be displayed in the scaled-down image display area 16, and the process proceeds to S97.

In S97, the detailed information 52 is rearranged so that the detailed information 52 about the image information for which the check box 42 is checked is displayed in the top position on the display screen, whereas the detailed information 52 about the image information for which the check box 42 is not checked is displayed in the bottom position on the display screen.

Next, it is determined whether N=X, i.e., all the sets of image information have been processed (S98). If not all the sets of image information have been processed, N is increased by 1 (N=N+1) in (S99), and steps S93–S99 are repeated. Once all the sets of image information have been processed, the display management table 12 is saved to the image information storage section 2 (S100).

Figure 16A:
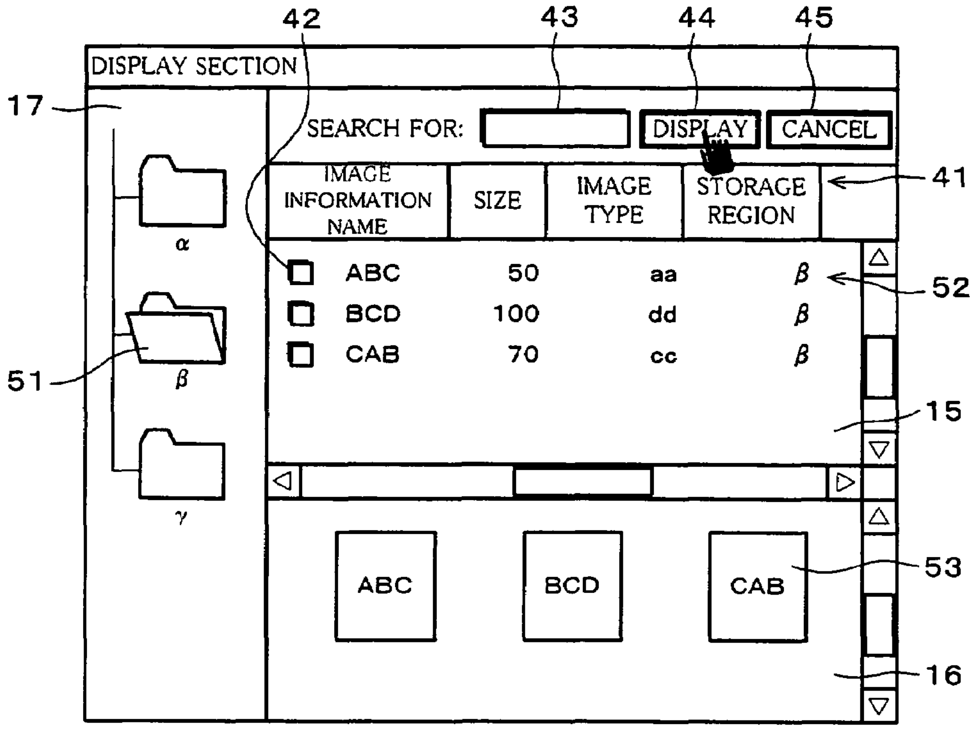
FIG. 16(*a*) is an explanatory view showing a display on the display section as a result of an ordinary interlinked display operation executed by the interlinked display control section of FIG. 1.
Figure 16B:
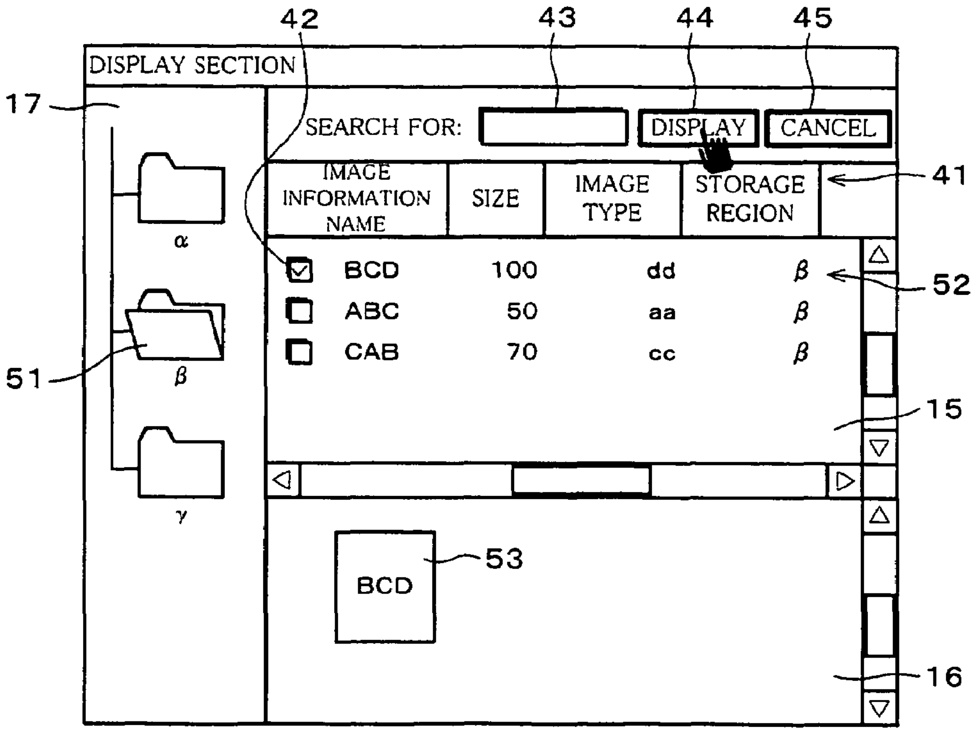

As detailed above, by the direct select display process executed by the direct select display control section 21 in the extract display control section 18 and the control operation executed by the interlinked display control section 27, the display section 3 effects, for example, an interlinked display of FIG. 16(*b*) with respect to the ordinary interlinked display of FIG. 16(*a*) (identical to that of FIG. 14(*a*))

Figure 15:
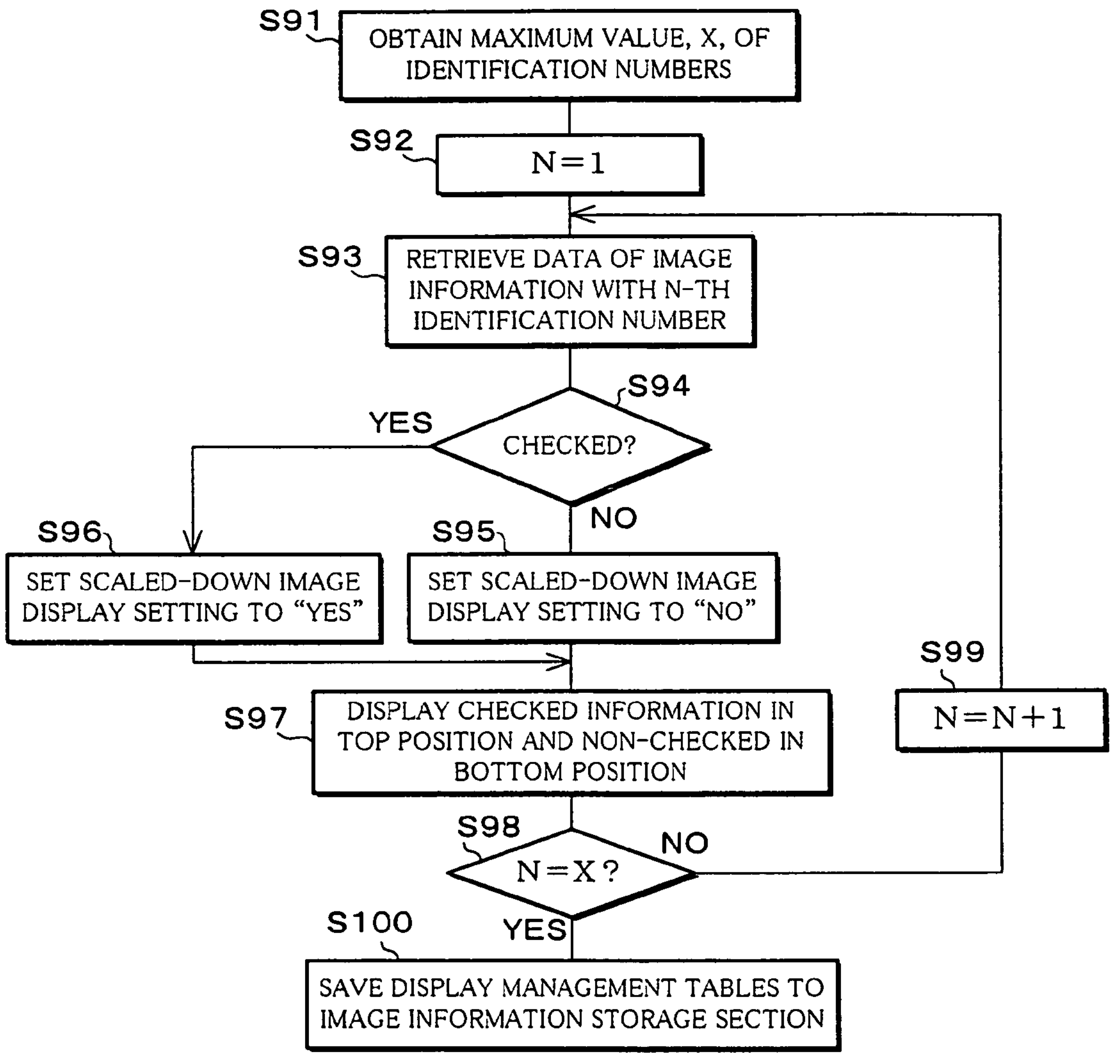
FIG. 15 is a flow chart showing, as another example, a direct select display process executed by the direct select display control section of FIG. 1, which is a process associated to the search display process of FIG. 13.

In other words, according to the direct select display process of FIG. 15, after the check box 42 provided in the first position in the row showing the detailed information 52 about the set of image information BCD is checked, by manipulating the display button 44, the detailed information display area 15 displays the detailed information 52 about all the set of image information ABC, BCD, and CAB; the detailed information 52(BCD) about the set of image information BCD for which the check box 42 is checked is displayed in the top position on the display screen, whereas the detailed information 52(ABC) and 52(CAB) about the other sets of image information ABC and CAB are displayed in the bottom positions on the display screen as shown in FIG. 16(*b*). In scaled-down image display area 16, only the scaled-down image 53 of the set of image information BCD for which the check box 42 is checked is extracted and displayed in the first position.

In the arrangement, the detailed information 52 about the image information stored in the selected folder 51 is all displayed in the detailed information display area 15; the set of detailed information 52 selected either directly or through a search is displayed in the top position on the display screen, whereas only selected scaled-down images 53 are displayed in the scaled-down image display area 16. Therefore, the result of the selection is visually recognizable.

Next, even another operation executed by the extract display control section 18 will be explained. Here, the detailed information 52 and scaled-down images 53 of all the sets of image information stored in the selected folder 51 are displayed with those selected either directly or through a search being displayed in or near the respective first positions in the rows showing the detailed information 52 and the scaled-down images 53 and those not selected being displayed in gray (non-selectable) in or near the respective last positions in the rows showing the detailed information 52 and the scaled-down images 53.

Those objects displayed in gray would be less visually recognizable on the display screen. Conversely, those not displayed in gray could be more readily recognized. In the gray display, objects are displayed in gray.

Note that those detailed information 52 and scaled-down images 53 that are not selected and therefore displayed in gray are not selectable and cannot be subjected to any process including delete, rearrange, and move. This is also applicable to the processes detailed later.

First, a search display process executed by the search display control section 22 will be explained in reference to the flow chart of FIG. 17. The process can be executed in place of the search display process of FIG. 10. Besides, the display management table 12 used here is the one shown in FIG. 18, not the one shown in FIG. 2.

In this process, once the operator enters search conditions in the search condition input box 43 (S111), the search display control section 22 obtains the maximum value of the identification numbers 36 in the display management tables 12, i.e., the total number, X, of the sets of image information stored in the selected folder 51 (S112).

Next, parameter N is set to 1 (S113), the data of the set of image information with the N-th identification number 36 is retrieved (S114), and it is determined whether or not the set of image information satisfies the search conditions (S115).

Figure 18:
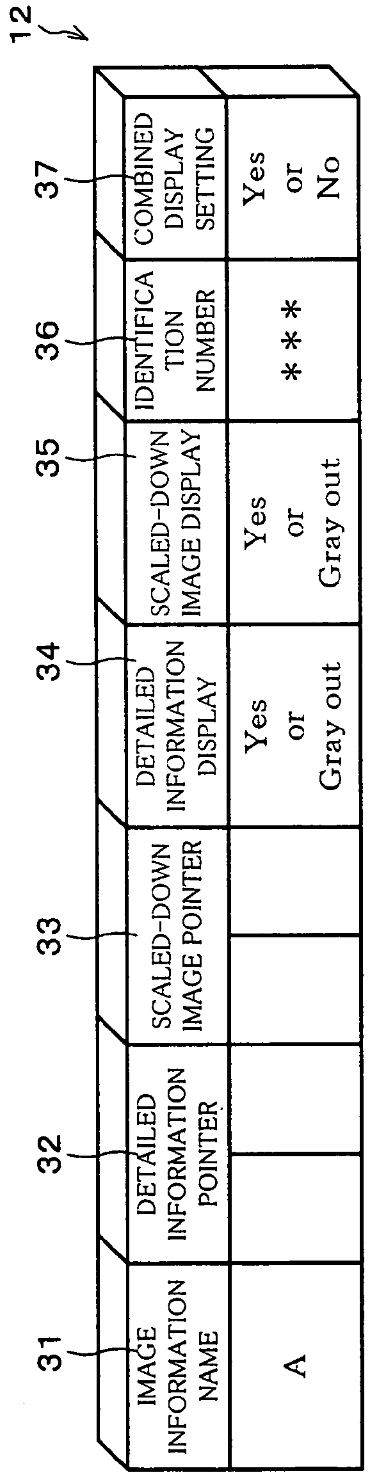
FIG. 18 is an explanatory view showing a display management table used in the process of FIG. 17.

If it is determined in the step that the set of image information does not satisfy the search conditions, the detailed information display setting 34 and the scaled-down image display setting 35 in the display management table 12 of FIG. 18 are set to "GRAY" so that the detailed information 52 and scaled-down images 53 of the image information are displayed in gray in the detailed information display area 15 and the scaled-down image display area 16 respectively (S116), and the process proceeds to S118.

Meanwhile, if it is determined in S115 that the set of image information satisfies the search conditions, the detailed information display setting 34 and the scaled-down image display setting 35 in the display management table 12 are set to "YES" so that the detailed information 52 and scaled-down image 53 of the image information are displayed in the detailed information display area 15 and the scaled-down image display area 16 respectively (S117), and the process proceeds to S118.

In S118, the detailed information 52 and scaled-down images 53 are rearranged so that the detailed information 52 and scaled-down image 53 of the image information satisfying the search conditions are displayed in or near the respective first positions, i.e., in or near the top and far left positions respectively, in the rows showing the detailed information 52 and the scaled-down images 53 in the detailed information display area 15 and the scaled-down image display area 16 on the display screen, and also so that the detailed information 52 and scaled-down images 53 of the image information not satisfying the search conditions are displayed in or near the respective last positions, i.e., in or near the bottom and far right positions respectively, in the rows showing the detailed information 52 and the scaled-down images 53 in the detailed information display area 15 and the scaled-down image display area 16 on the display screen.

Next, it is determined whether N=X, i.e., all the sets of image information have been processed (S119). If not all the sets of image information have been processed, N is increased by 1 (N=N+1) in (S120), and steps S114–S120 are repeated. Once all the sets of image information have been processed, the display management table 12 is saved to the image information storage section 2 (S121).

Figure 19:
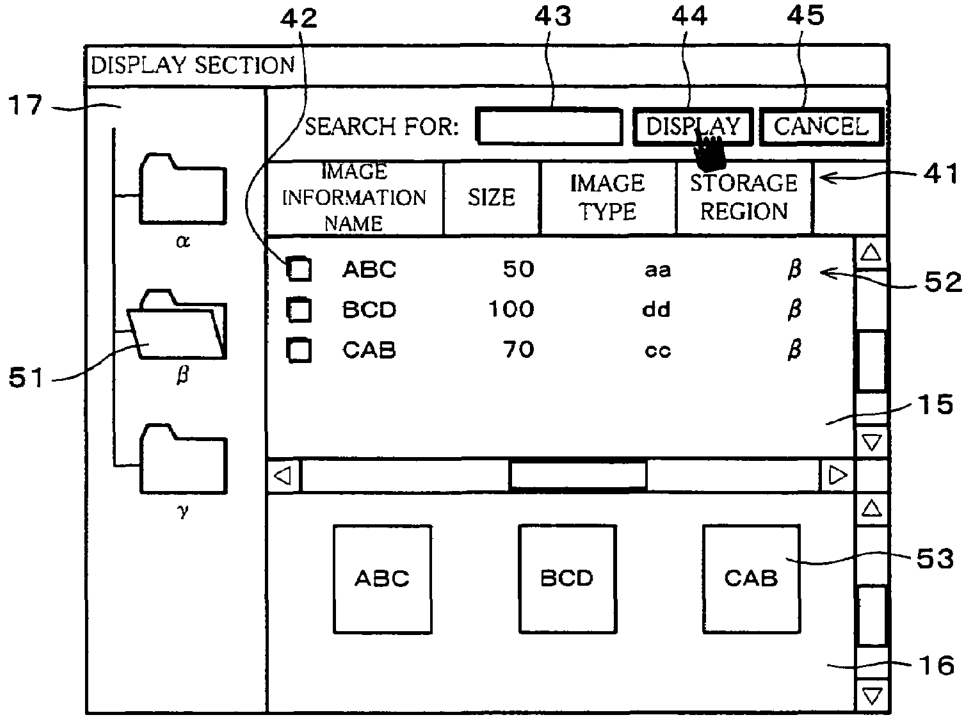
FIG. 19(*a*) is an explanatory view showing a display on the display section as a result of an ordinary interlinked display operation executed by the interlinked display control section of FIG. 1.
Figure 19:
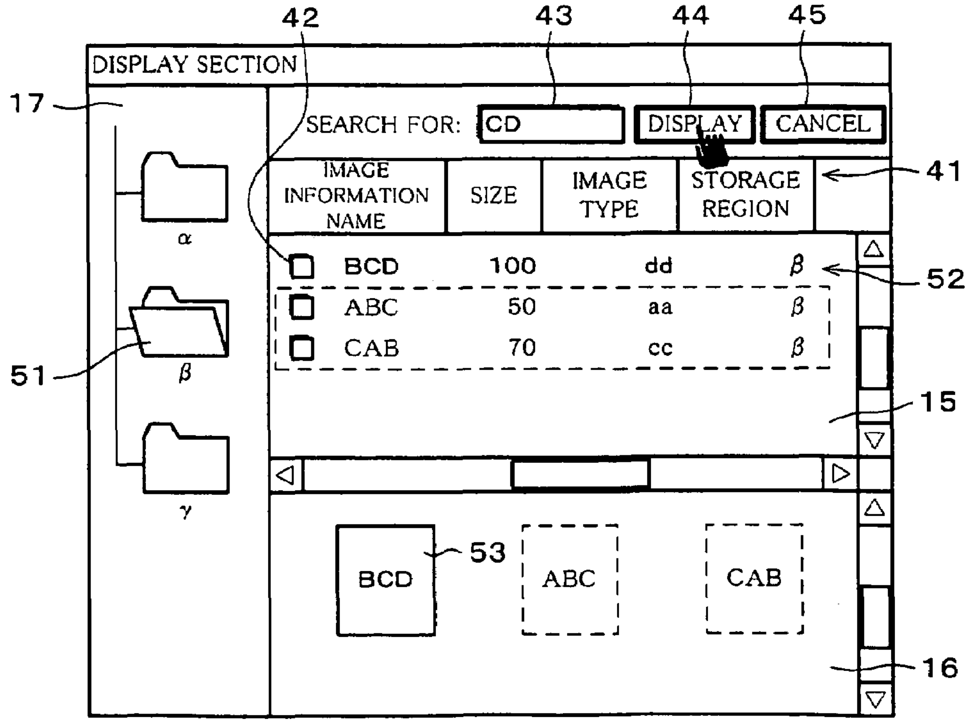

As detailed above, by the search display process executed by the search display control section 22 in the extract display control section 18 and the control operation executed by the interlinked display control section 27, the display section 3 effects, for example, an interlinked display of FIG. 19(*b*) with respect to an ordinary interlinked display of FIG. 19(*a*).

In other words, according to the ordinary interlinked display effected by the interlinked display control section 27, the detailed information 52 and scaled-down images 53 of the sets of image information ABC, BCD, and CAB stored in the selected folder 51(β) shown in the hierarchical structure display area 17 are displayed in the detailed information display area 15 and the scaled-down image display area 16 respectively as shown in FIG. 19(*a*).

Figure 17:
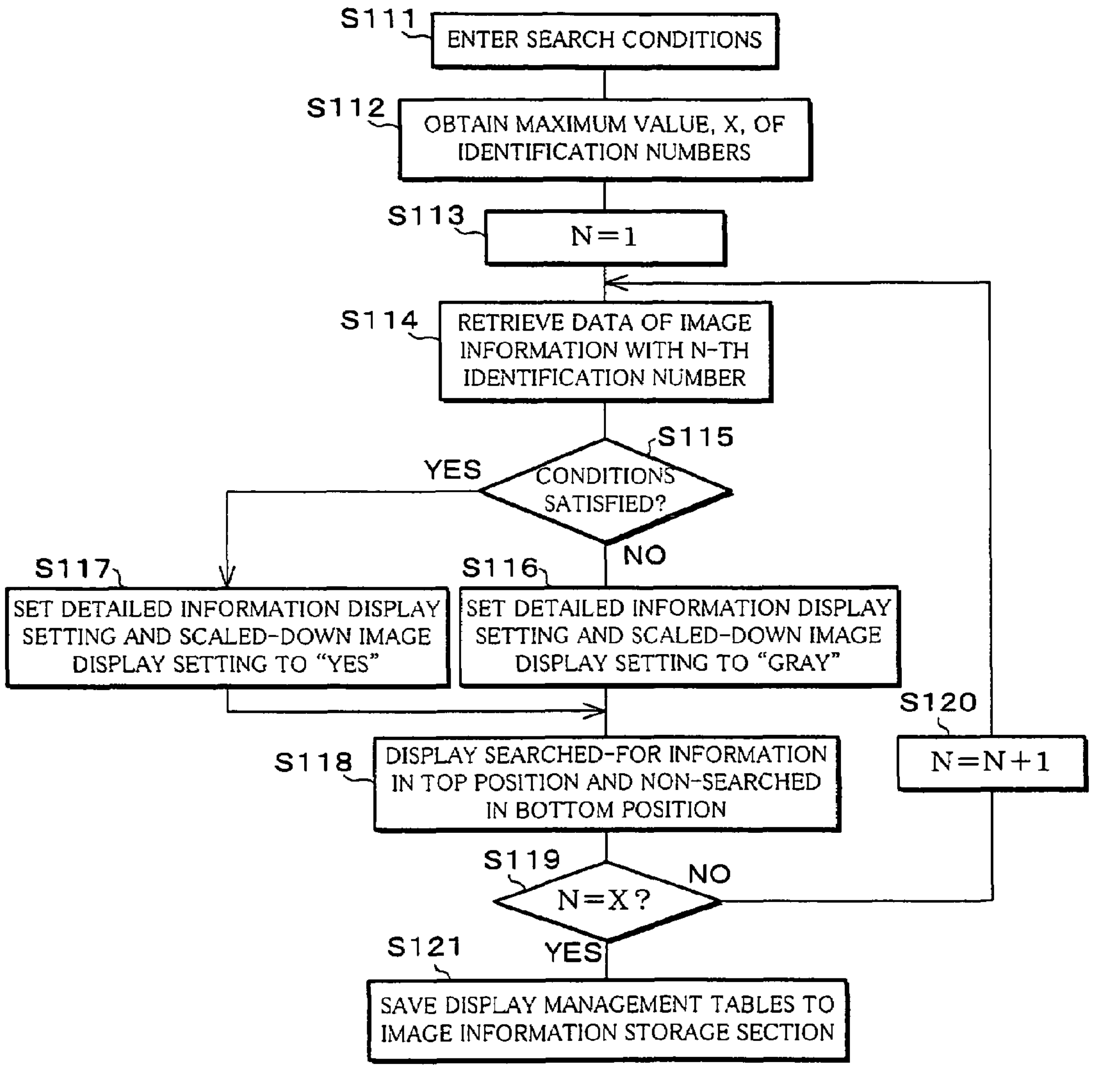
FIG. 17 is a flow chart showing, as a further example, a search display process executed by the search display control section of FIG. 1.

Meanwhile, according to the search display process of FIG. 17, by entering, for example, "CD" in the search condition input box 43 as search conditions and manipulating the display button 44 as shown in FIG. 19(*b*), the detailed information 52 and scaled-down images 53 of all the sets of image information ABC, BCD, CAB are displayed in the detailed information display area 15 and the scaled-down image display area 16 respectively; the detailed information 52(BCD) and scaled-down image 53(BCD) of the set of image information BCD satisfying the search conditions "CD" are displayed in the respective first positions in the rows showing the detailed information 52 and the scaled-down images 53 in the detailed information display area 15 and the scaled-down image display area 16, whereas the detailed information 52(ABC) and 52(CAB) and scaled-down images 53(ABC) and 53(CAB) of the other sets of image information ABC and CAB are displayed in gray in the right positions in the rows on the display screen. In FIG. 19(*b*) and later figures, those displayed in gray are enclosed by broken lines.

Next, a direct select display process executed by the direct select display control section 21, corresponding to the search display process of FIG. 17, will be explained in reference to the flow chart of FIG. 20. The process can be executed in place of the direct select display process of FIG. 10.

In the process, the direct select display control section 21 obtains the maximum value of the identification numbers 36 in the display management tables 12, i.e., the total number, X, of the sets of image information stored in the selected folder 51 (S131).

Next, parameter N is set to 1 (S132), the data of the set of image information with the N-th identification number 36 is retrieved (S133), and it is determined whether or not the check box 42 for the set of image information is checked (S134).

If it is determined in the step that the check box 42 is not checked, the detailed information display setting 34 and the scaled-down image display setting 35 in the display management table 12 of FIG. 18 are set to "GRAY" so that the detailed information 52 and scaled-down image 53 of the set of image information are displayed in gray in the detailed information display area 15 and the scaled-down image display area 16 (S135), and the process proceeds to S137.

Meanwhile, if it is determined in S134 that the check box 42 is checked, the detailed information display setting 34 and the scaled-down image display setting 35 in the display management table 12 are set to "YES" so the detailed information 52 and scaled-down image 53 of the image information are displayed in the detailed information display area 15 and the scaled-down image display area 16 (S136), the process proceeds to S137.

In S137, the detailed information 52 and scaled-down images 53 are rearranged so that the detailed information 52 and scaled-down image 53 of the image information for which the check box 42 is checked are displayed in or near the respective first positions, i.e., in or near the top and far left positions respectively, in the rows showing the detailed information 52 and the scaled-down images 53 in the detailed information display area 15 and the scaled-down image display area 16 on the display screen, and also so that the detailed information 52 and scaled-down images 53 of the image information for which the check box 42 is not checked are displayed in or near the respective last positions, i.e., in or near the bottom and far right positions respectively, in the rows showing the detailed information 52 and the scaled-down images 53.

Next, it is determined whether N=X, i.e., all the sets of image information have been processed (S138). If not all the sets of image information have been processed, N is increased by 1 (N=N+1) in (S140), and steps S133–S140 are repeated. Once all the sets of image information have been processed, the display management table 12 is saved to the image information storage section 2 (S139).

Figure 21A:
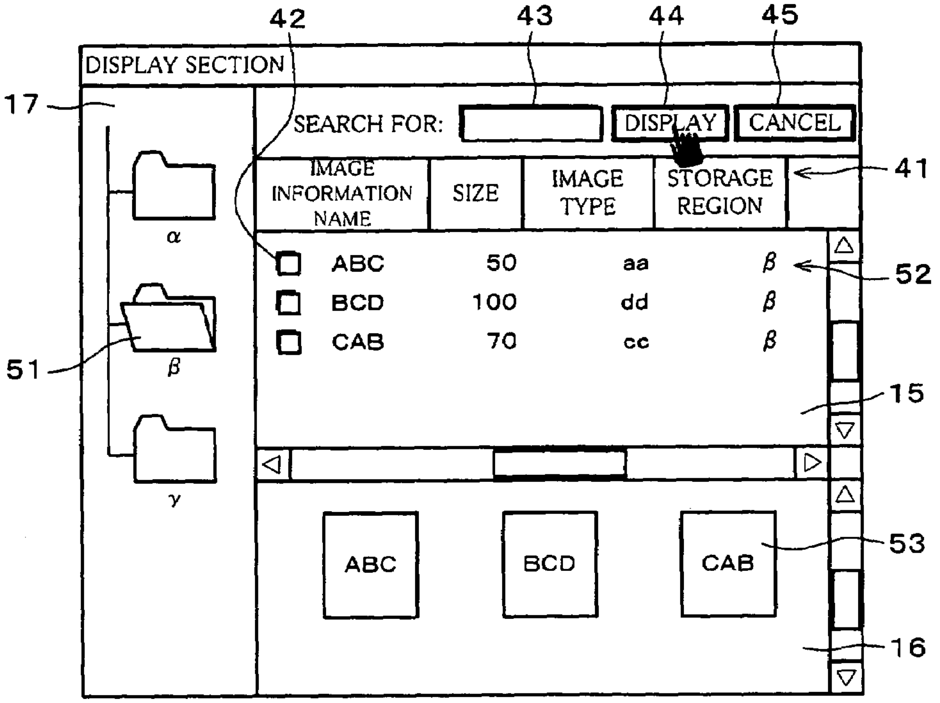
FIG. 21(*a*) is an explanatory view showing a display on the display section as a result of an ordinary interlinked display operation executed by the interlinked display control section of FIG. 1.
Figure 21B:
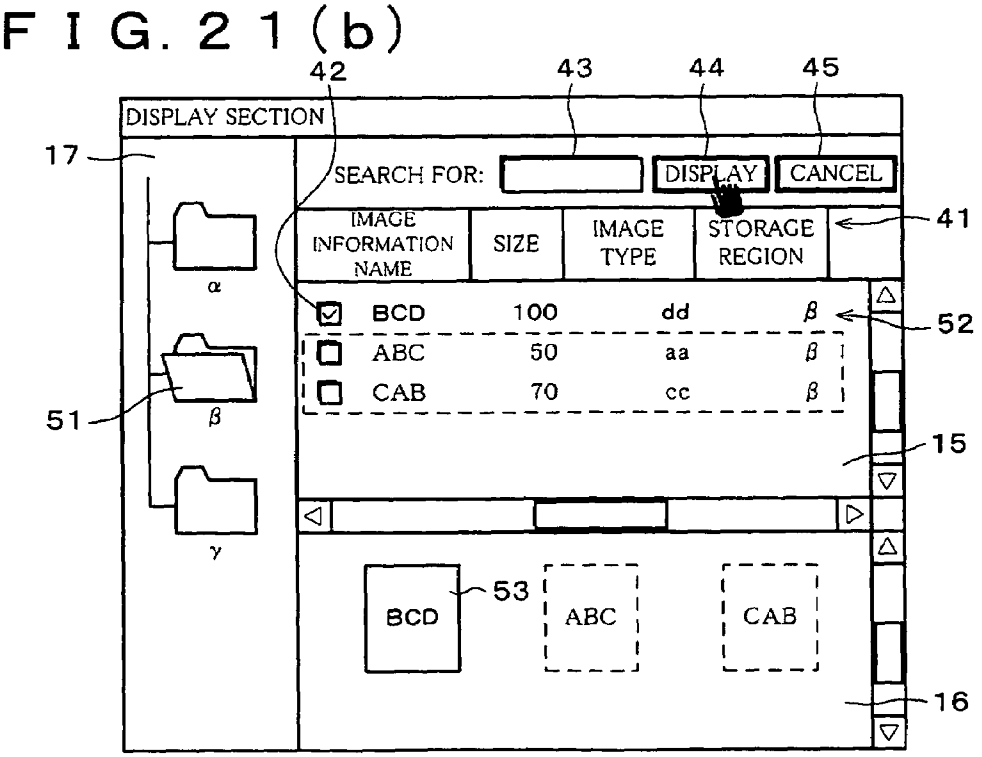

As detailed above, by the direct select display process executed by the direct select display control section 21 in the extract display control section 18 and the control operation executed by the interlinked display control section 27, the display section 3 effects, for example, an interlinked display of FIG. 21(*b*) with respect to the ordinary interlinked display of FIG. 21(*a*).

Figure 20:
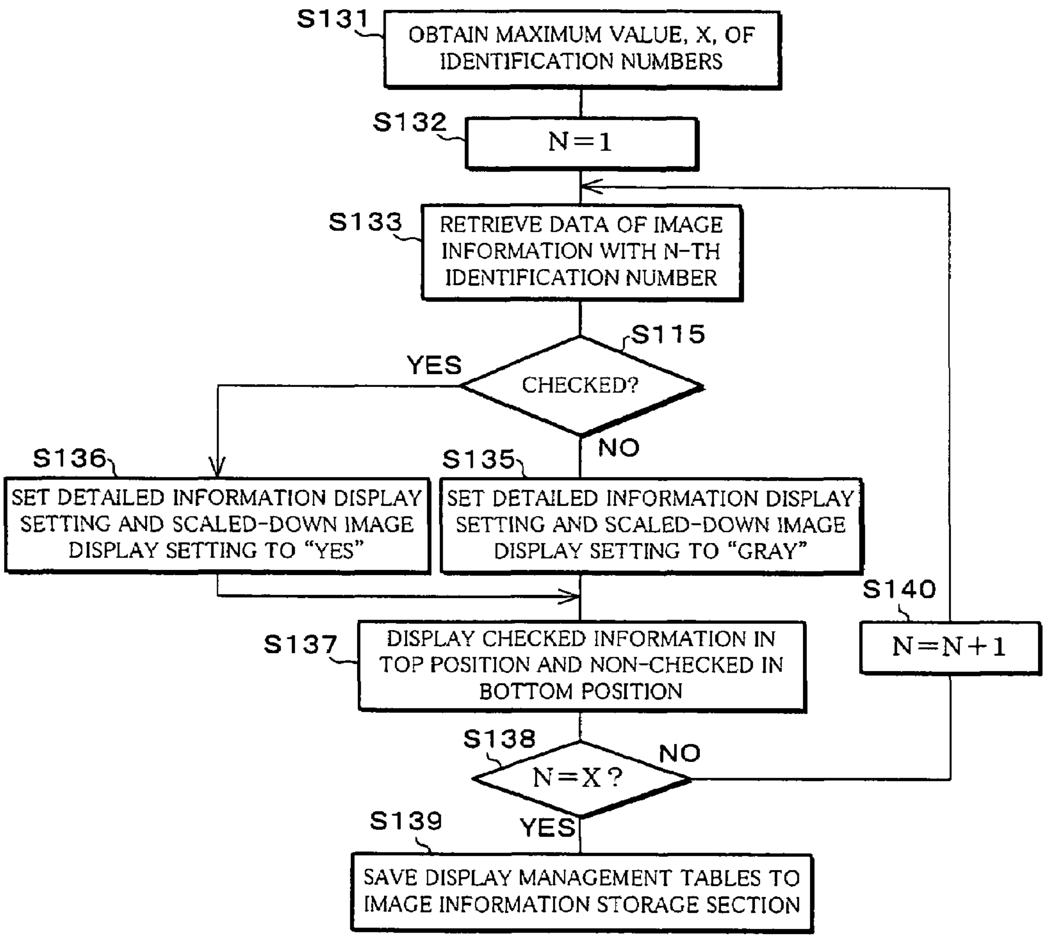
FIG. 20 is a flow chart showing, as still another example, a direct select display process executed by the direct select display control section of FIG. 1, which is a process associated to the search display process of FIG. 17.

In other words, according to the direct select display process of FIG. 20, after the check box 42 provided in the first position in the row showing the detailed information 52 about the set of image information BCD is checked, by manipulating the display button 44, the detailed information display area 15 and the scaled-down image display area 16 display respectively the detailed information 52 and scaled-down images 53 of all the set of image information ABC, BCD, and CAB; the detailed information 52(BCD) and scaled-down image 53 (BCD) of the set of image information BCD for which the check box 42 is checked are displayed in the respective first positions in the rows showing the detailed information 52 and scaled-down images 53 in the detailed information display area 15 and the scaled-down image display area 16, whereas the detailed information 52(ABC) and 52(CAB) and scaled-down image 53(ABC) and scaled-down image 53(CAB) of the other sets of image information ABC and CAB are displayed in grey in the respective last positions in the rows on the display screen as shown in FIG. 21(*b*).

In the arrangement, the detailed information 52 and scaled-down images 53 of the image information stored in the selected folder 51 are all displayed in the detailed information display area 15 and the scaled-down image display area 16; the detailed information 52 and scaled-down image 53 selected either directly or through a search are displayed in or near the respective first positions in the row on the display screen, whereas those not selected are displayed in gray in or near the last positions in the row on the display screen. Therefore, the result of the selection is visually recognizable.

Next, even another operation executed by the extract display control section 18 will be explained. Here, the detailed information 52 about all the sets of image information stored in the selected folder 51 is displayed with those selected either directly or through a search being displayed in or near the respective first positions in the rows showing the detailed information 52 and the those not selected being displayed in gray in or near the respective last positions in the rows showing the detailed information 52. The scaled-down images 53 selected either directly or through a search are displayed in or near the respective first positions in the rows showing the scaled-down images 53, whereas those not selected are not displayed.

First, a search display process executed by the search display control section 22 will be explained in reference to the flow chart of FIG. 22. The process can be executed in place of the search display process of FIG. 10. Besides, the display management table 12 used here is the one shown in FIG. 23, not the one shown in FIG. 2.

In this process, once the operator enters search conditions in the search condition input box 43 (S151), the search display control section 22 obtains the maximum value of the identification numbers 36 in the display management tables 12, i.e., the total number, X, of the sets of image information stored in the selected folder 51 (S152).

Next, parameter N is set to 1 (S153), the data of the set of image information with the N-th identification number 36 is retrieved (S154), and it is determined whether or not the set of image information satisfies the search conditions (S155).

Figure 23:
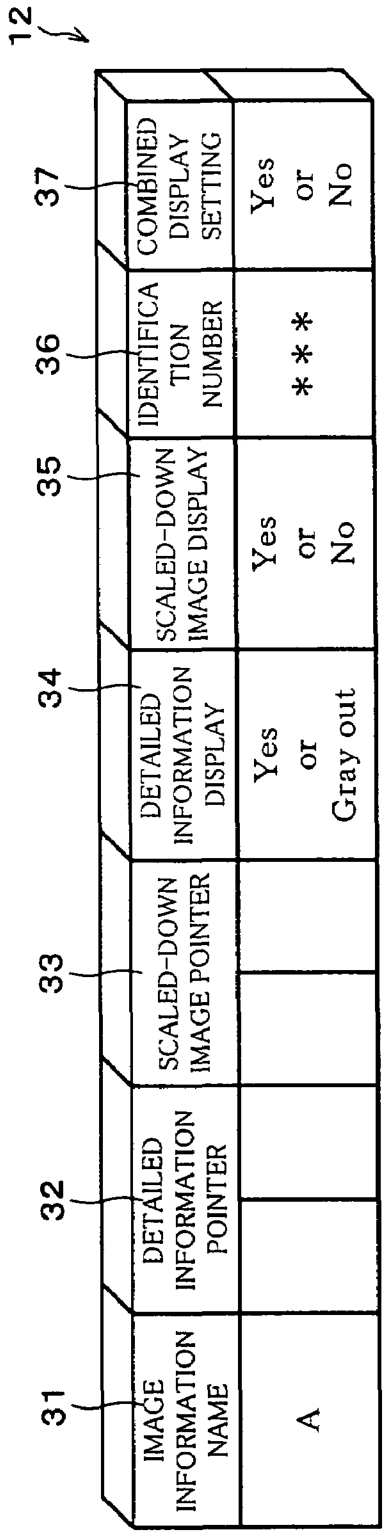
FIG. 23 is an explanatory view showing a display management table used in the process of FIG. 22.

If it is determined in the step that the set of image information does not satisfy the search conditions, the detailed information display setting 34 in the display management table 12 of FIG. 23 is set to "GRAY" so that the detailed information 52 about the set of image information is displayed in gray in the detailed information display area 15, and the scaled-down image display setting 35 in the display management table 12 is set to "NO" so that the scaled-down image 53 of the set of image information is not displayed in the scaled-down image display area 16 (S156) Thereafter, the process proceeds to S158.

Meanwhile, if it is determined in S155 that the set of image information satisfies the search conditions, the detailed information display setting 34 and scaled-down image display setting 35 in the display management table 12 are set to "YES" so that the detailed information 52 and scaled-down image 53 of the set of image information are displayed in the detailed information display area 15 and the scaled-down image display area 16 (S157), and the process proceeds to S158.

In S158, the detailed information 52 and scaled-down images 53 are rearranged so that the detailed information 52 and scaled-down image 53 of the image information satisfying the search conditions are displayed in or near the respective first positions, i.e., in or near the top and far left positions respectively, in the rows showing the detailed information 52 and the scaled-down images 53 in the detailed information display area 15 and the scaled-down image display area 16 on the display screen, and also so that the detailed information 52 about the image information not satisfying the search conditions are displayed in the bottom positions on the display screen.

Next, it is determined whether N=X, i.e., all the sets of image information have been processed (S159). If not all the sets of image information have been processed, N is increased by 1 (N=N+1) in (S160), and steps S154–S160 are repeated. Once all the sets of image information have been processed, the display management table 12 is saved to the image information storage section 2 (S161).

Figure 24A:
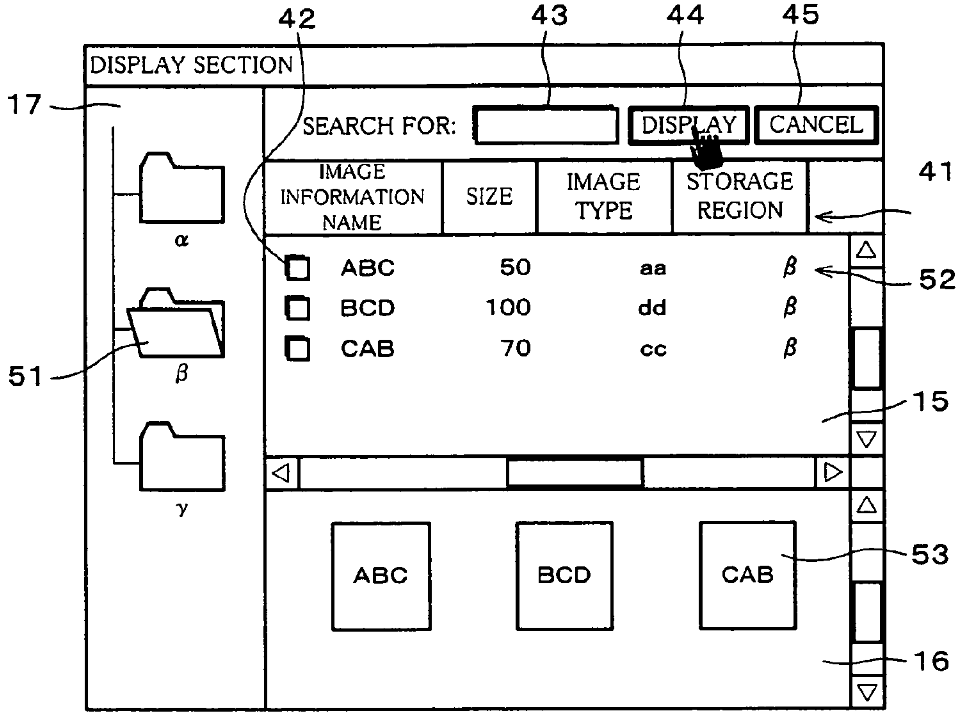
FIG. 24(*a*) is an explanatory view showing a display on the display section as a result of an ordinary interlinked display operation executed by the interlinked display control section of FIG. 1
Figure 24B:
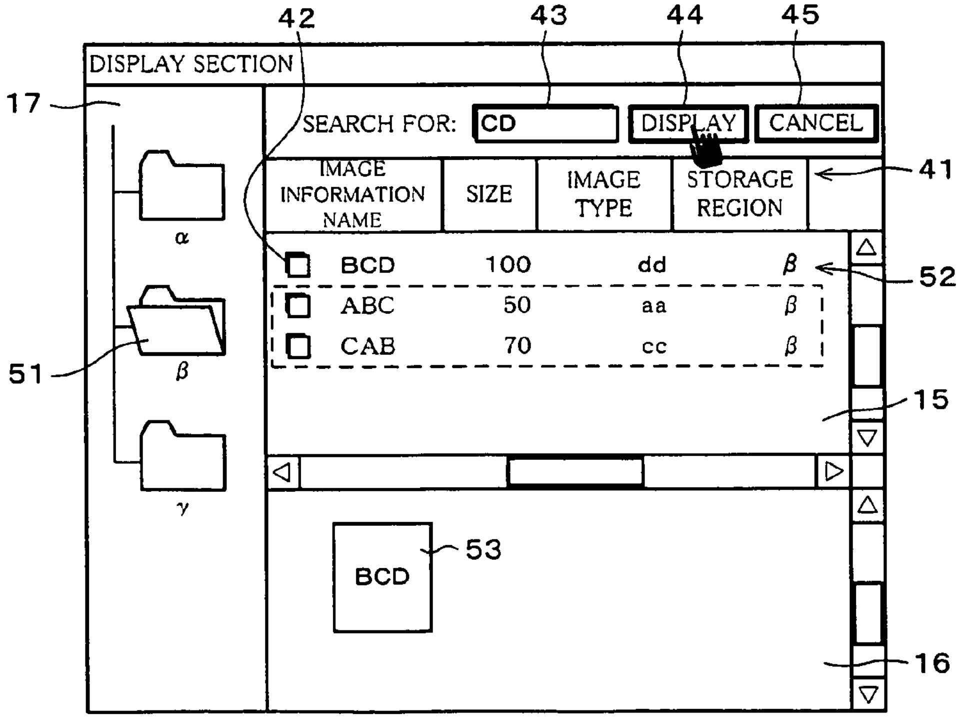

As detailed above, by the search display process executed by the search display control section 22 in the extract display control section 18 and the control operation executed by the interlinked display control section 27, the display section 3 effects, for example, an interlinked display of FIG. 24(*b*) with respect to an ordinary interlinked display of FIG. 24(*a*).

In other words, according to the ordinary interlinked display effected by the interlinked display control section 27, the detailed information 52 and scaled-down images 53 of the sets of image information ABC, BCD, and CAB stored in the selected folder 51(β) shown in the hierarchical structure display area 17 are displayed in the detailed information display area 15 and the scaled-down image display area 16 respectively as shown in FIG. 24(*a*).

Figure 22:
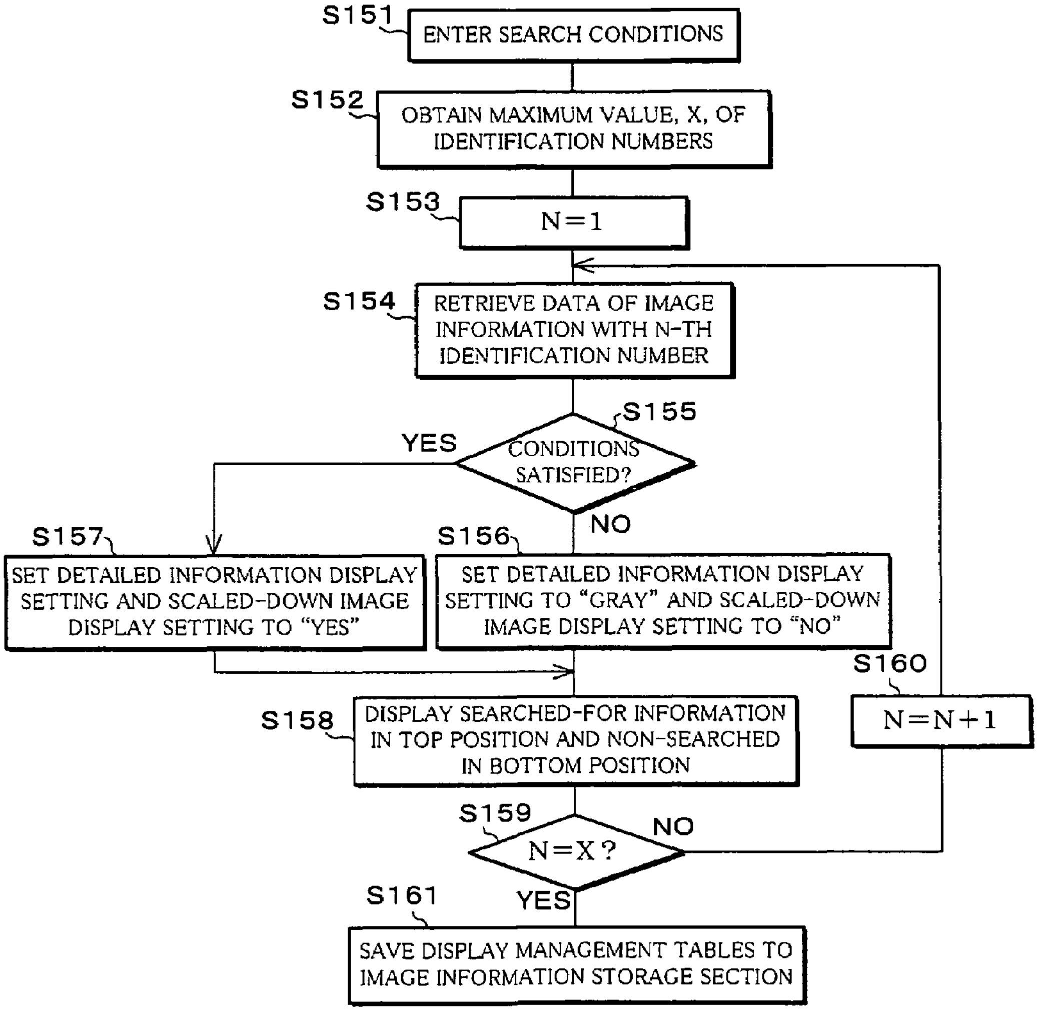
FIG. 22 is a flow chart showing, an even another example, a search display process executed by the search display control section of FIG. 1.

Meanwhile, according to the search display process of FIG. 22, by entering, for example, "CD" in the search condition input box 43 as search conditions and manipulating the display button 44 as shown in FIG. 24(*b*), the detailed information 52 about all the sets of image information ABC, BCD, CAB is displayed in the detailed information display area 15; the detailed information 52 (BCD) about the set of image information BCD satisfying the search conditions "CD" is displayed in the first positions in the row showing the detailed information 52 in the detailed information display area 15, whereas the detailed information 52(ABC) and 52(CAB) about the other sets of image information ABC and CAB are displayed in gray in the last positions in the rows on the display screen. In the scaled-down image display area 16, only the scaled-down image 53(BCD) of the set of image information BCD satisfying the search conditions "CD" is displayed in the first position in the row showing the scaled-down image 53 in the scaled-down image display area 16.

Next, a direct select display process executed by the direct select display control section 21 and corresponding to the search display process of FIG. 22 will be explained in reference to the flow chart of FIG. 25. The process can be executed in place of the direct select display process of FIG. 10.

In the process, the direct select display control section 21 obtains the maximum value of the identification numbers 36 in the display management tables 12, i.e., the total number, X, of the sets of image information stored in the selected folder 51 (S171).

Next, parameter N is set to 1 (S172), the data of the set of image information with the N-th identification number 36 is retrieved (S173), and it is determined whether or not the check box 42 for the set of image information is checked (S174).

If it is determined in the step that the check box 42 is not checked for the image information, the detailed information display setting 34 in the display management table 12 of FIG. 23 is set to "GRAY" so that the detailed information 52 about the image information is displayed in gray in the detailed information display area 15, and the scaled-down image display setting 35 in the display management table 12 is set to "NO" so that the scaled-down image 53 of the set of image information is not displayed in the scaled-down image display area 16 (S175). Thereafter, the process proceeds to S177.

Meanwhile, If it is determined in S174 that the check box 42 is checked, the detailed information display setting 34 and scaled-down image display setting 35 in the display management table 12 are set to "YES" so that the detailed information 52 and scaled-down image 53 of the image information for which the check box 42 is checked are displayed in the detailed information display area 15 and the scaled-down image display area 16 respectively (S176), and the process proceeds to S177.

In S177, the detailed information 52 and scaled-down images 53 are rearranged so that the detailed information 52 and scaled-down image 53 of the image information for which the check box 42 is checked are displayed in or near the respective first positions, i.e., in or near the top and far left positions respectively, in the rows showing the detailed information 52 and the scaled-down images 53 in the detailed information display area 15 and the scaled-down image display area 16 on the display screen, and also so that the detailed information 52 about the image information for which the check box 42 is not checked is displayed in the bottom position on the display screen.

Next, it is determined whether N=X, i.e., all the sets of image information have been processed (S178). If not all the sets of image information have been processed, N is increased by 1 (N=N+1) in (S180), and steps S173–S180 are repeated. Once all the sets of image information have been processed, the display management table 12 is saved to the image information storage section 2 (S179).

Figure 26:
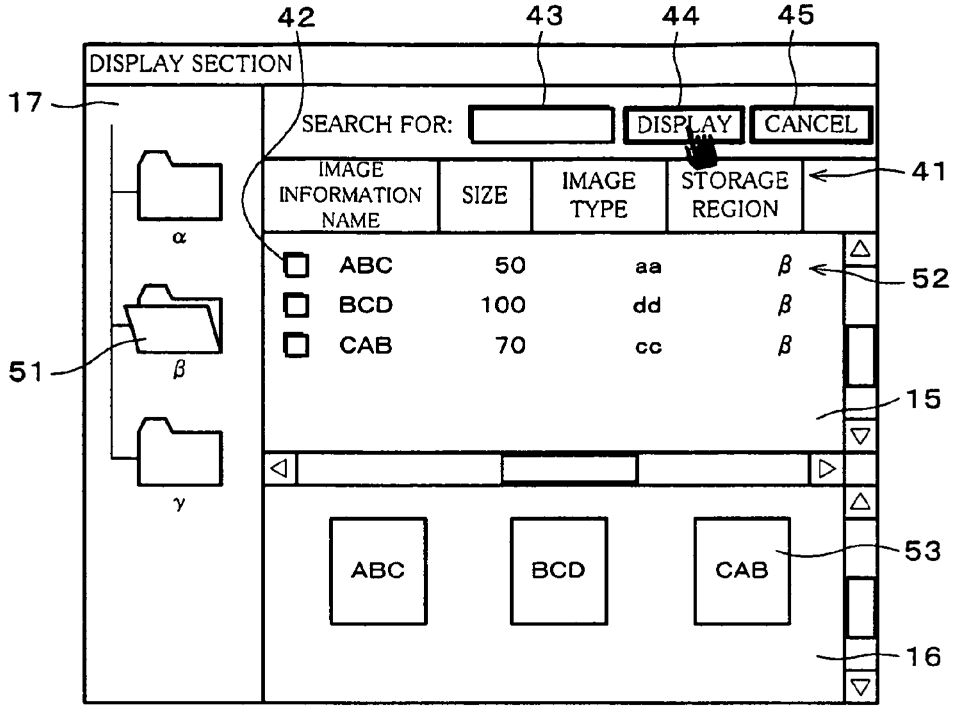
FIG. 26(*a*) is an explanatory view showing a display on the display section as a result of an ordinary interlinked display operation executed by the interlinked display control section of FIG. 1.
Figure 26:
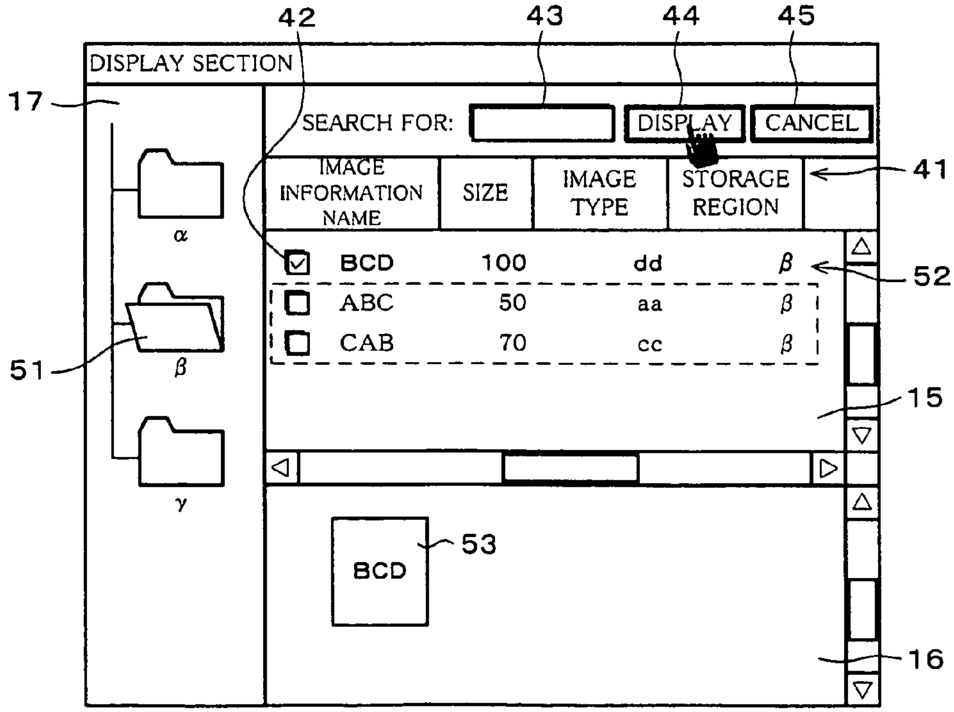

As detailed above, by the direct select display process executed by the direct select display control section 21 in the extract display control section 18 and the control operation executed by the interlinked display control section 27, the display section 3 effects, for example, an interlinked display of FIG. 26(*b*) with respect to the ordinary interlinked display of FIG. 26(*a*).

Figure 25:
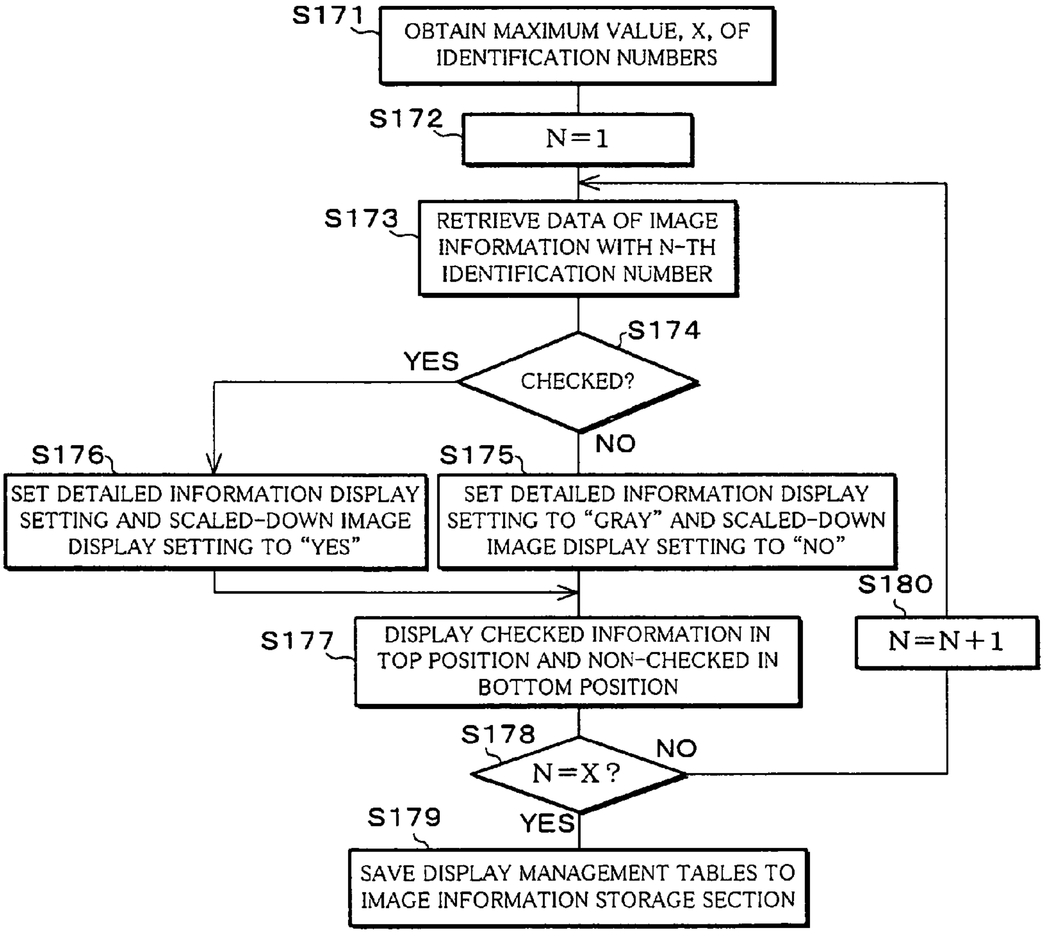
FIG. 25 is a flow chart showing, as another example, a direct select display process executed by the direct select display control section of FIG. 1, which is a process associated to the search display process of FIG. 22.

In other words, according to the direct select display process of FIG. 25, after the check box 42 provided in the first position in the row showing the detailed information 52 about the set of image information BCD is checked, by manipulating the display button 44, the detailed information display area 15 displays the detailed information 52 about all the set of image information ABC, BCD, and CAB; the detailed information 52(BCD) about the set of image information BCD for which the check box 42 is checked is displayed in the first position in the row showing the detailed information 52 in the detailed information display area 15, whereas the detailed information 52(ABC) and 52(CAB) about the other sets of image information ABC and CAB are displayed in gray in the last positions in the rows on the display screen as shown in FIG. 26(*b*). In scaled-down image display area 16, only the scaled-down image 53 (BCD) of the set of image information BCD for which the check box 42 is checked is displayed in the first position in the row showing the scaled-down images 53.

In the arrangement, the detailed information 52 about the image information stored in the selected folder 51 is all displayed in the detailed information display area 15; those selected either directly or through a search are displayed in or near the respective first positions in the rows on the display screen, whereas those not selected are displayed in gray in or near the respective last positions in the rows on the display screen. Further, only the selected scaled-down images 53 are displayed in or near the respective first positions in the rows on the display screen. Therefore, the result of the selection is visually recognizable.

Next, the operation executed by the combined display control section 19 in the image information display control section 4 of FIG. 1 will be explained in reference to FIG. 27 to FIG. 31. In the image information processing device, by the operation executed by the combined display control section 19, the detailed information 52 and scaled-down images 53 can be displayed not only about the image information stored in a single folder 51 in the hierarchical structure display area 17, but also about the image information stored in more than one folders 51 in a combined manner as shown in FIG. 28.

Figure 27:
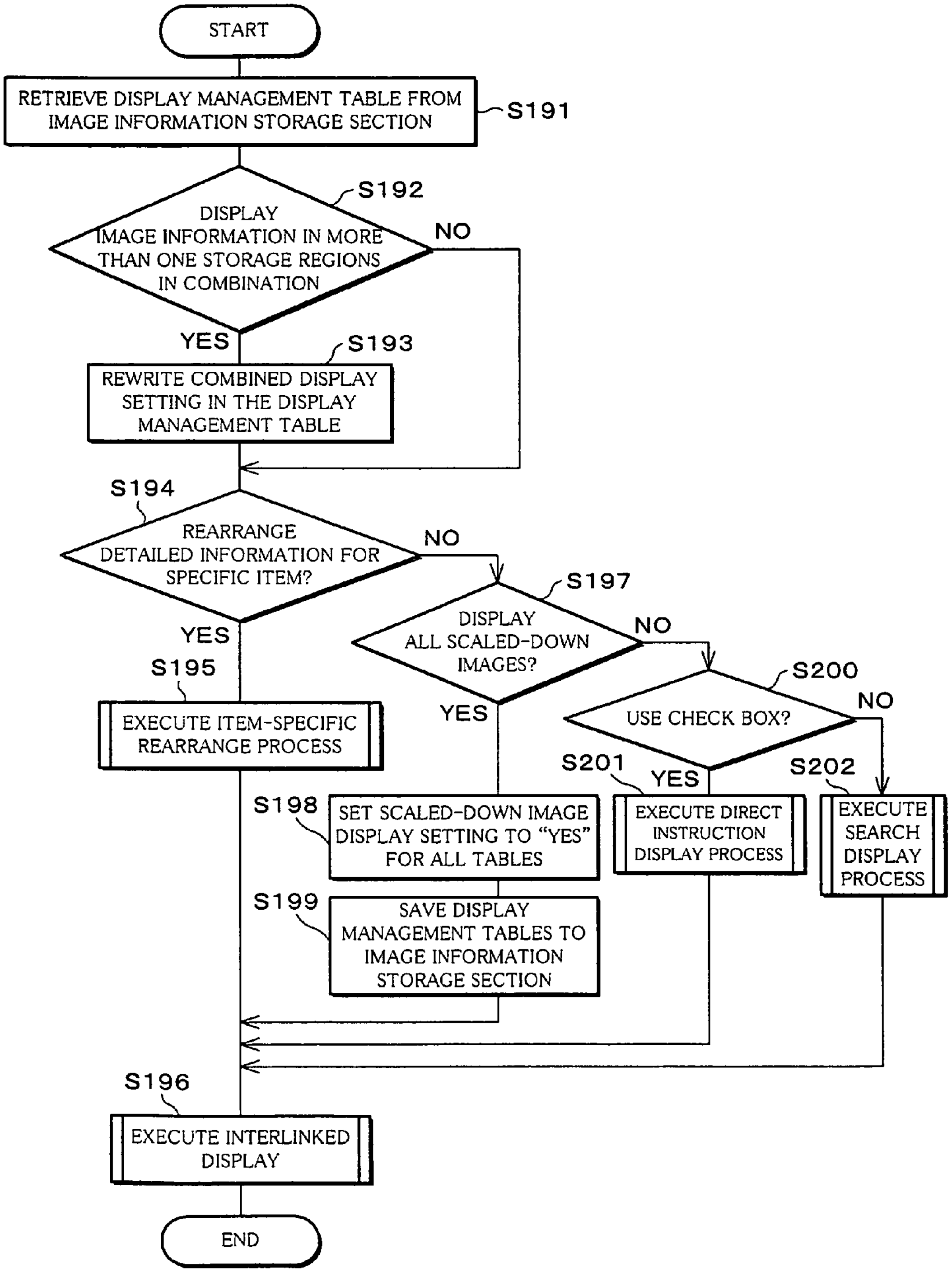
FIG. 27 is a flow chart showing a combined display process executed by the combined display control section of FIG. 1 and subsequent processes.
Figure 28:
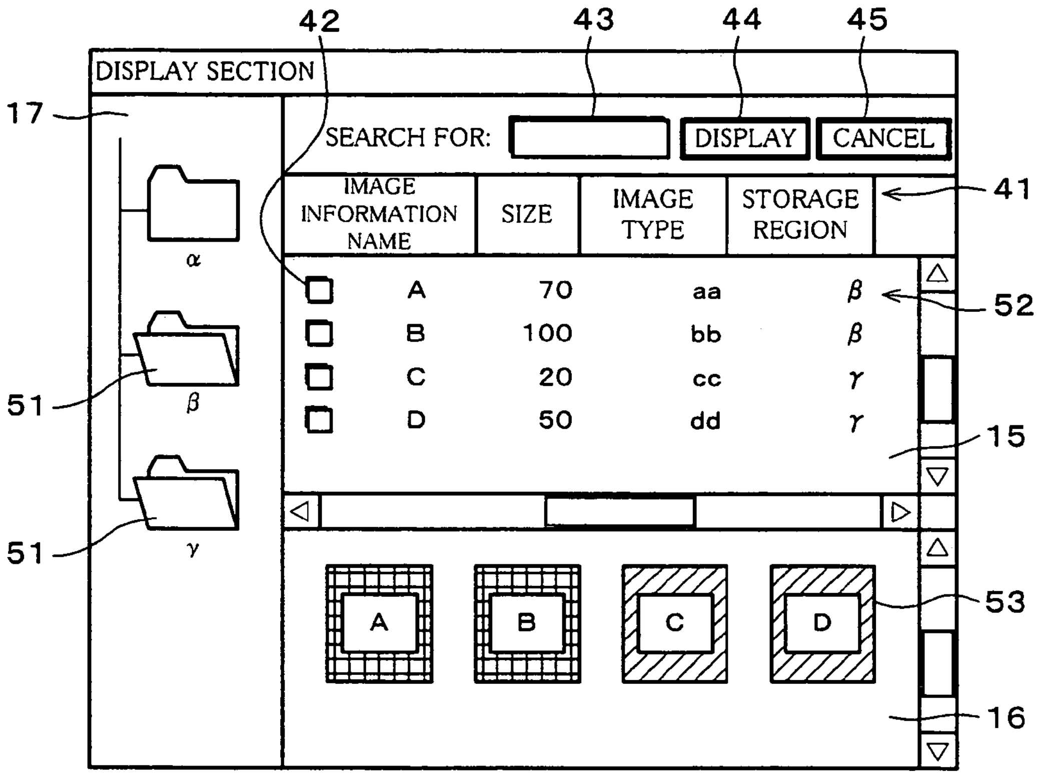
FIG. 28 is an explanatory view showing a display on the display section as a result of the combined display process of FIG. 27 executed by the combined display control section.

As shown in FIG. 27, in a combined display process, the combined display control section 19, first, retrieves a display management table 12 from the image information storage section 2 (S191).

Next, when more than one folders 51 are selected in the hierarchical structure display area 17 in the display section 3, it is determined whether or not the image information stored in the folders 51 is to be displayed in combination (S192).

If it is determined in S192 that the image information is to be displayed in a combined manner, the combined display setting 37 in the display management table 12 of FIG. 2, for example, is set to "YES" so that all the detailed information 52 and scaled-down images 53 of the image information stored the selected folders 51 are displayed in combination in the detailed information display area 15 and the scaled-down image display area 16 (S193).

In this manner, by selecting more than one folders 51 and setting the combined display setting 37 in the display management table 12 to "YES", a single virtual storage region spanning across more than one folders 51 is formed so that the detailed information 52 stored in more than one storage regions is displayed in combination in the detailed information display area 15 and also that the scaled-down images 53 stored in more than one storage regions are displayed in combination in the scaled-down image display area 16.

Here, the scaled-down images 53 are displayed in different colors according to the folders 51, for example, so as to readily visually distinguish between those of the image information in a folder 51 from those of the image information in another folder 51. Each set of image information in the selected folders 51 is given a different identification number 36. Further, the detailed information 52 about the image information now includes another detailed information item, "Storage Region Name," making it possible to identify the folder 51 in which the image information is stored.

Next, it is determined in S194 whether or not the detailed-information-item-specific rearrange display has been selected. If this display is selected, the process proceeds to S195 where the detailed-information-item-specific rearrange display control section 20 executes a rearrange process on the detailed information 52 about the image information in the selected folders 51 according to the procedures shown in FIG. 8. The detailed-information-item-specific rearrange display is selectable, as mentioned earlier, by the manipulating the size button of the item selection button 41, for example.

Thereafter, in S196, the interlinked display control section 27 in the image information display management section 6 executes a interlinked display process according to the procedures shown in FIG. 5.

Figure 10:
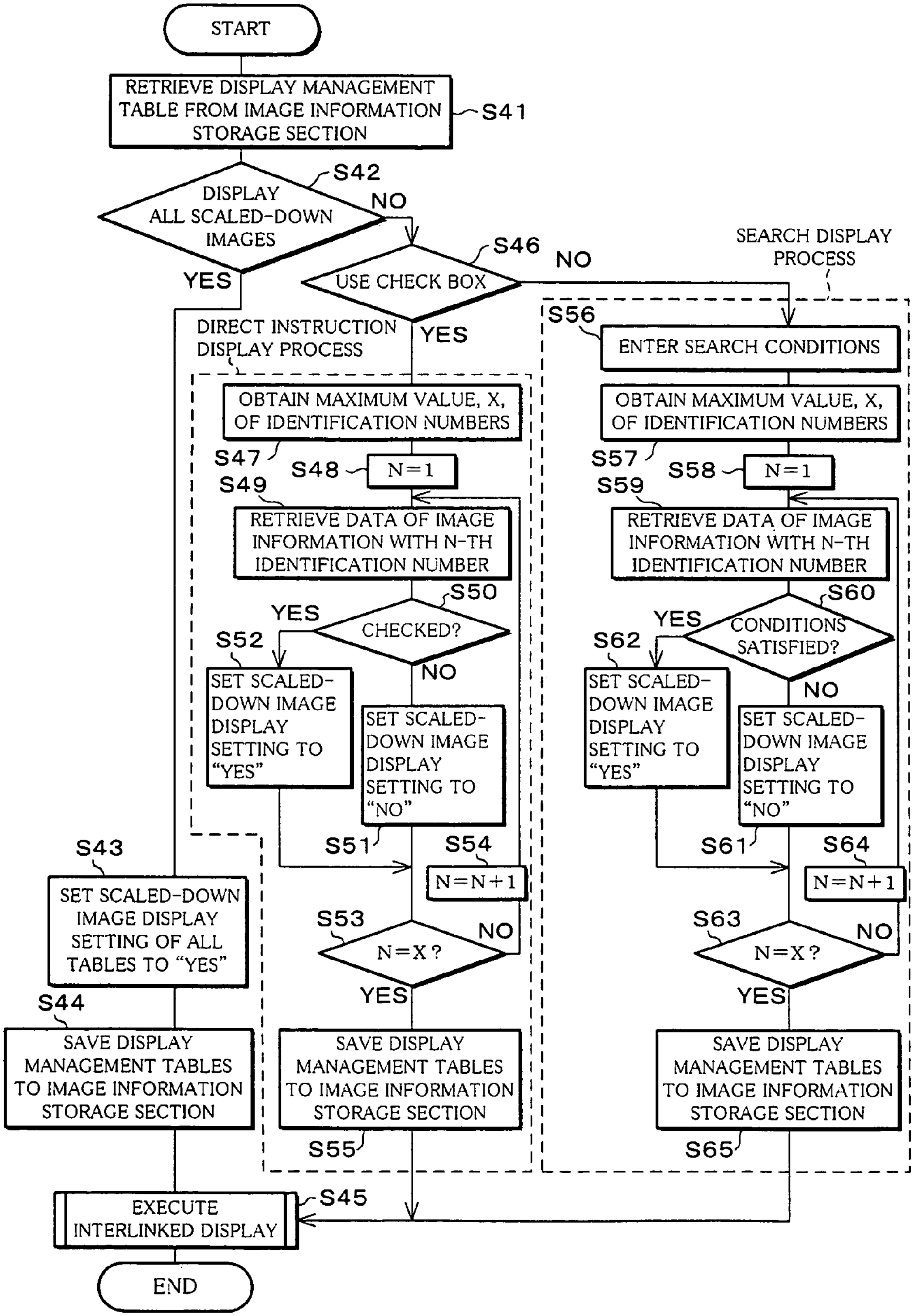
FIG. 10 is a flow chart showing a direct display process and a search display process executed, respectively, by the direct select display control section and the search display control section in the extract display control section of FIG. 1.

S197–S202 in a case where the detailed-information-item-specific rearrange display is not selected in S194 are identical to the process shown in FIG. 10, but with details being omitted. Therefore, even when the detailed information 52 and scaled-down images 53 of the image information stored in more than one folders 51 are displayed in combination in the detailed information display area 15 and the scaled-down image display area 16 respectively, an extract display (a direct select display process and search display process) and an interlinked display are executable respectively by the extract display control section 18 and the interlinked display control section 27 in the image information display management section 6 on the detailed information 52 and scaled-down images 53 according to the procedures of S194–S202, in the same manner as when the detailed information 52 and scaled-down images 53 of the image information stored in a single folder 51 are displayed.

By the foregoing control operation by the combined display control section 19 in the image information display control section 4, the display section 3 displays in combination as shown in FIG. 28, for example.

In other words, when more than one folders 51, i.e., a folder 51(β) and a folder 51(γ), are selected as shown in FIG. 28, the combined display control section 19 displays the detailed information 52(A)–52(D) and scaled-down images 53(A)–53(D) of the sets of image information A and B stored in the folder 51(β) and the sets of image information C and D stored in the folder 51(γ) in the detailed information display area 15 and the scaled-down image display area 16 respectively.

Here, the scaled-down images 53(A) and 53(B) are displayed in a different color from that of the scaled-down images 53(C) and 53(D) so as to readily visually distinguish between the scaled-down images 53(A) and 53(B) of the sets of image information A and B stored in the folder 51(β) and the scaled-down images 53(C) and 53(D) of the sets of image information C and D stored in the different folder 51(γ). Further, the detailed information 52(A)–52(D) includes another detailed information item, "Storage Region Name (identification information)," making it possible to identify the folder 51 in which the image information is stored.

By the foregoing display process, the present image information processing device allows the user to readily move, store, compare, and perform other processes on sets of image information in different folders 51.

Figure 29A:
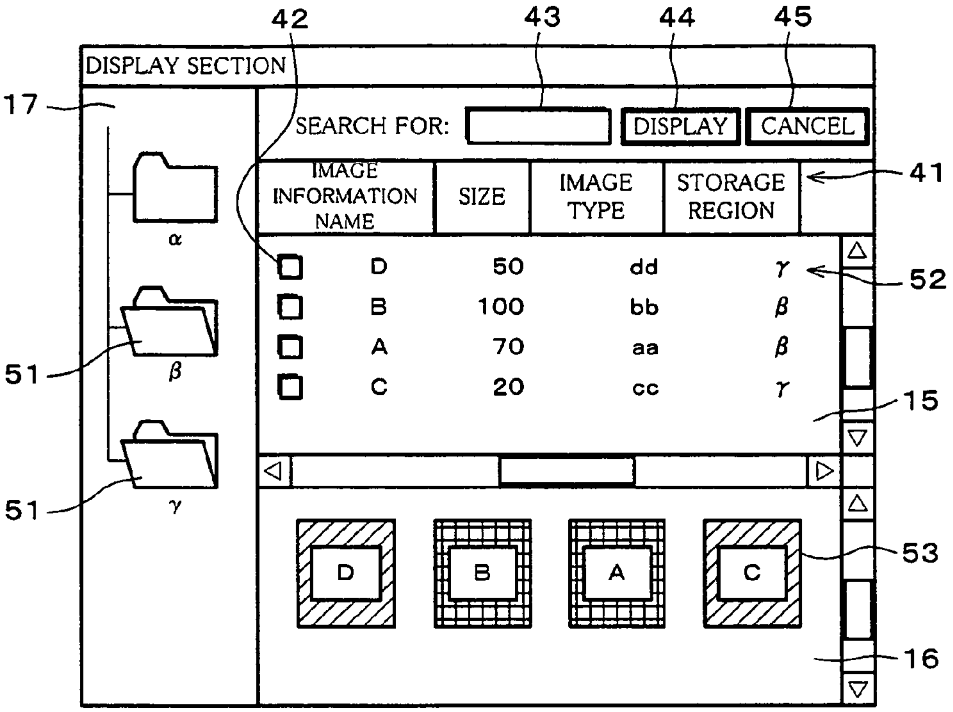
FIG. 29(*a*) is an explanatory view showing, as an example, a display on the display section as a result of the foregoing combined display process.
Figure 29B:
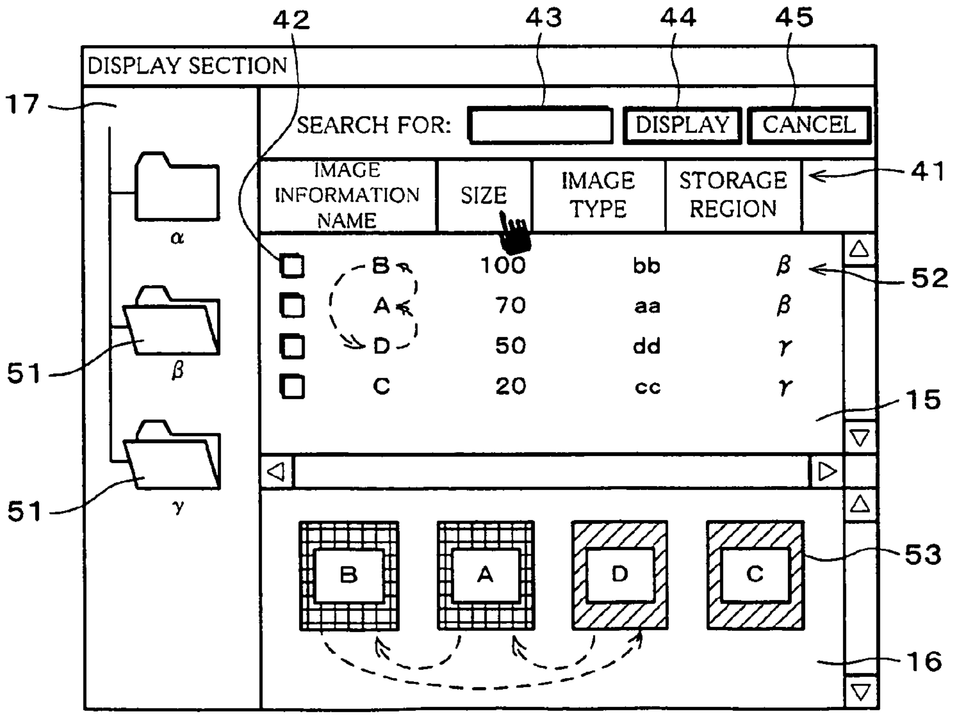

Besides, if the detailed-information-item-specific rearrange display control section 20 executes a rearrange process for a detailed information item while the combined display control section 19 is executing a combined display as shown in, for example, FIG. 29(*a*), the at-a-glance display of the detailed information 52 and scaled-down images 53 in the display section 3 changes as shown in, for example, FIG. 29(*b*).

In other words, as shown in FIG. 29(*a*), image information sizes are displayed as a detailed information item in the detailed information display area 15, and the detailed information 52 about the image information D, B, A, and C is displayed in this order. The image information sizes are 50, 100, 70, and 120 from top to bottom. When the sets of detailed information 52 are to be rearranged and listed in specified, descending order by image information size by a rearrange process, if the size button of the item selection button 41 is manipulated through the input section 1, the detailed information 52 is rearranged and listed in descending order by image information size as shown in FIG. 29(*b*).

Further, as interlinked with the rearrange process on the detailed information 52 in the detailed information display area 15, the scaled-down images 53 are rearranged and listed in the scaled-down image display area 16 in the same display order as that of the corresponding sets of detailed information 52 in the detailed information display area 15.

If the size button is manipulated again in FIG. 29(*b*), the sets of detailed information 52 are rearranged and listed in ascending order by image information size. As interlinked with this, the scaled-down images 53 are rearranged and listed in the same display order as that of the corresponding sets of detailed information 52.

Figure 30:
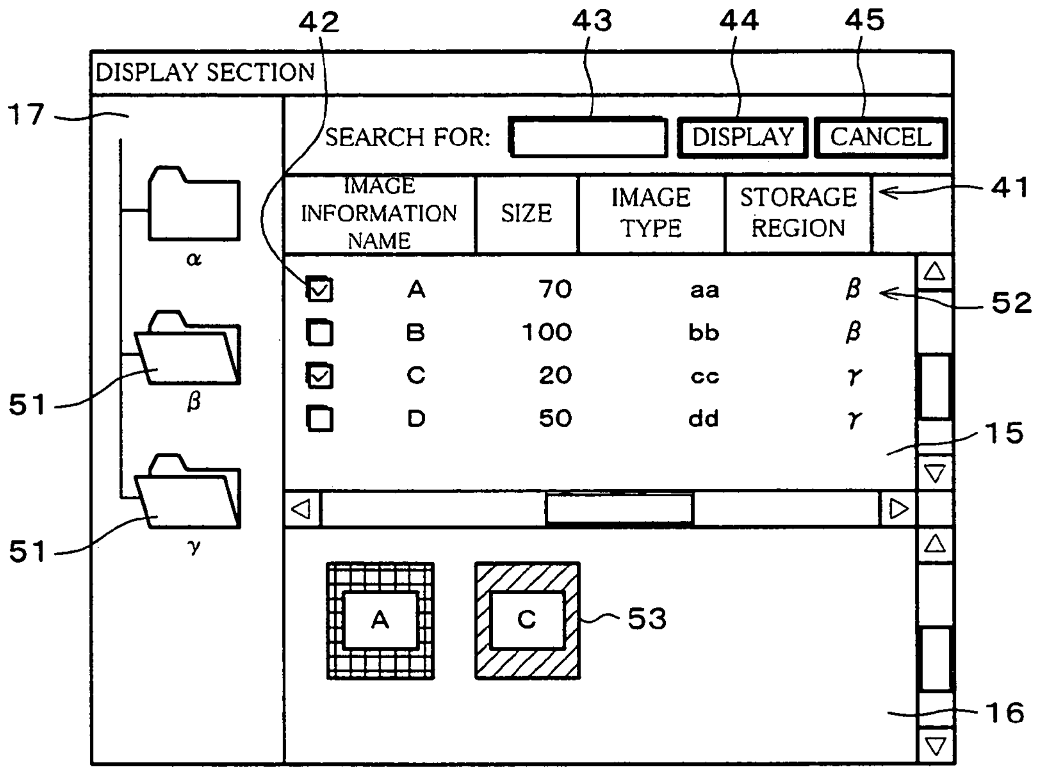
FIG. 30 is an explanatory view showing a display on the display section when the direct select display control section has executed a direct select display process on the display of FIG. 28 which is a result of a combined display process.
Figure 31:
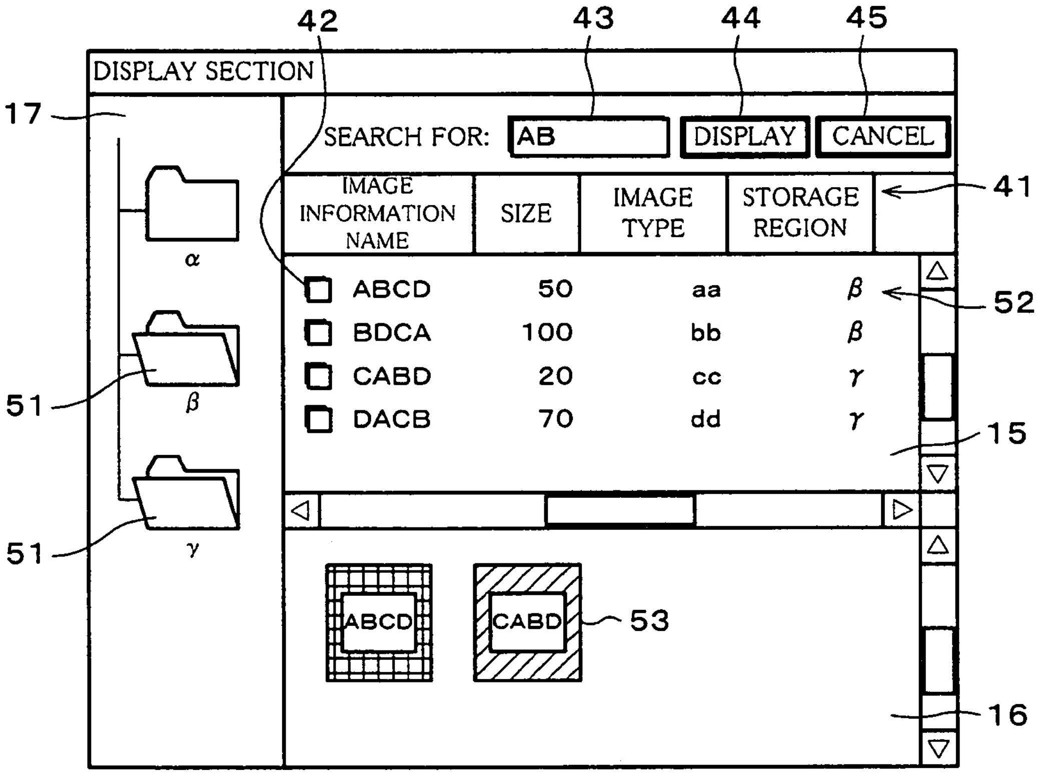
FIG. 31 is an explanatory view showing a display on the display section when the search display control section has executed a search display process on the display of FIG. 28 which is a result of a combined display process.

Further, if a direct select display process is executed by the direct select display control section 21 in the extract display control section 18 in the image information display control section 4 and a search display process is executed by the search display control section 22 in the extract display control section 18 in the image information display control section 4, while the combined display control section 19 is executing a combined display as shown in, for example, FIG. 28, the at-a-glance display of the sets of detailed information 52 and scaled-down images 53 in the display section 3 changes as shown in FIGS. 30 and 31 respectively.

In other words, in the direct select display process, by selectively checking for example, only the check boxes 42 for the detailed information 52(A) and 52(C) from those provided in the first positions in the rows showing sets of detailed information 52 in the detailed information display area 15 and manipulating the display button 44, only the scaled-down images 53(A) and 53(C) are extracted and displayed in the scaled-down image display area 16.

In the search display process, by entering, for example, "AB" in the search condition input box 43 as search conditions and manipulating the display button 44, only the scaled-down images 53(ABCD) and 53(CABD) of the image information ABCD and CABD whose names include the string of characters "AB" are extracted and displayed.

Note although here, a case has been explained where the direct select display process and search display process shown in FIG. 10 are executed, the same description is applicable to the foregoing, other direct select display process and search display process.

Moreover, in the present image information processing device, more than one folders 51 are selected in the hierarchical structure display area 17 as follows.

A folder 51 is highlighted default when selected through the input section 1. The detailed information 52 and scaled-down images 53 of the image information stored in a folder 51 are displayed in the detailed information display area 15 and the scaled-down image display area 16 respectively at the same time as the folder 51 is selected through the input section 1 or as the display button 44 is manipulated following the selection of a folder 51.

Figure 32:
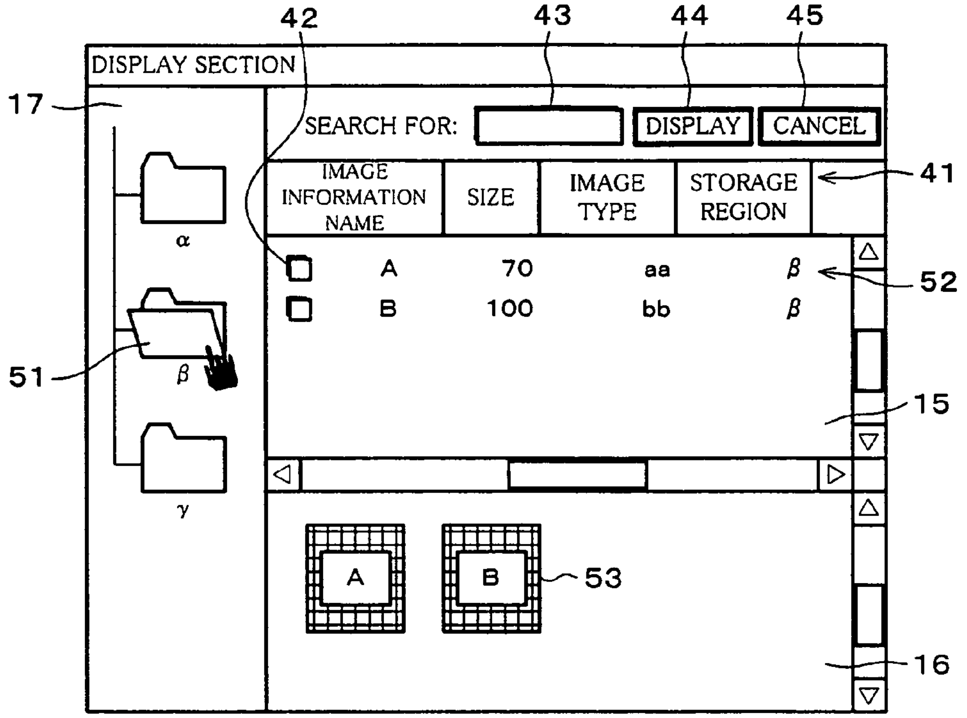
FIG. 32(*a*) is an explanatory view showing a display on the display section when the first folder is selected in a one-by-one select operation in the combined display process of FIG. 27.
Figure 32:
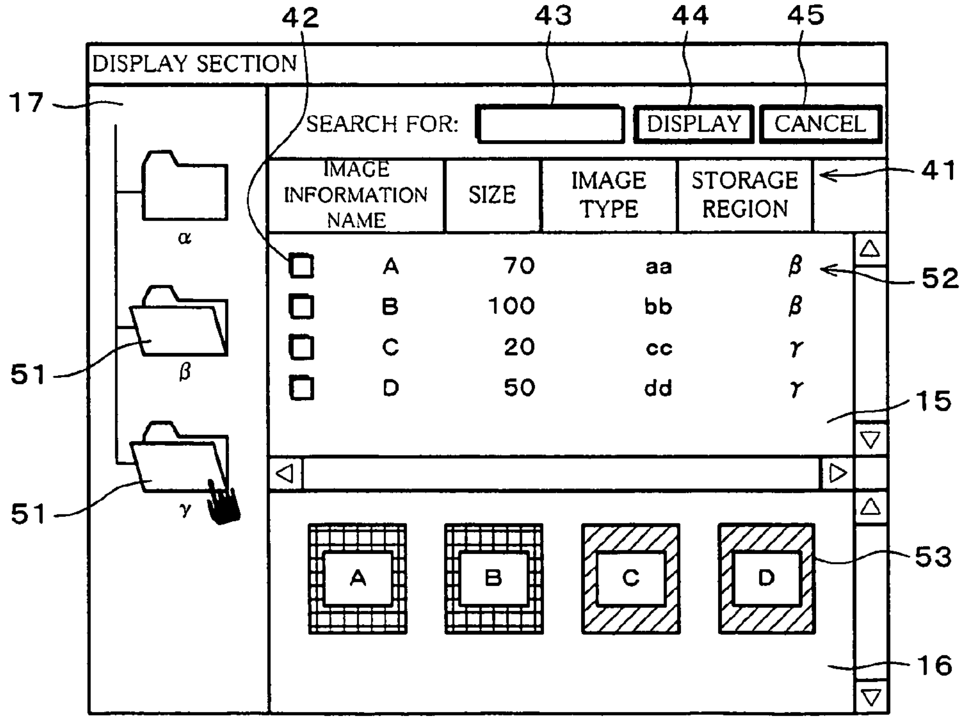

Folders 51 can be selected through the input section 1, for example, by selecting those folders 51 to be opened one by one while holding down a specified button (for example, "Ctrl" key on the keyboard). Every time a new folder 51 is selected, its detailed information 52 and scaled-down image 53 are added in the detailed information display area 15 and the scaled-down image display area 16 as shown in FIGS. 32(*a*) and 32(*b*).

Figure 33A:
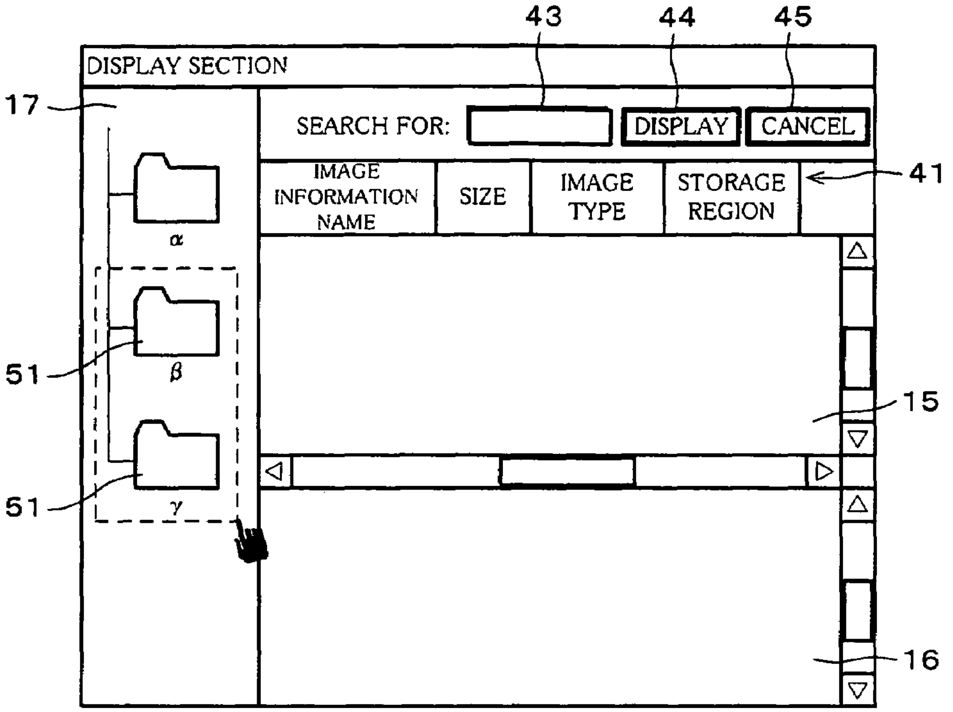
FIG. 33(*a*) is an explanatory view showing a display on the display section in a manipulation of specifying a folder to be selected in the case of a multiple simultaneous select operation in the combined display process of FIG. 27.
Figure 33B:
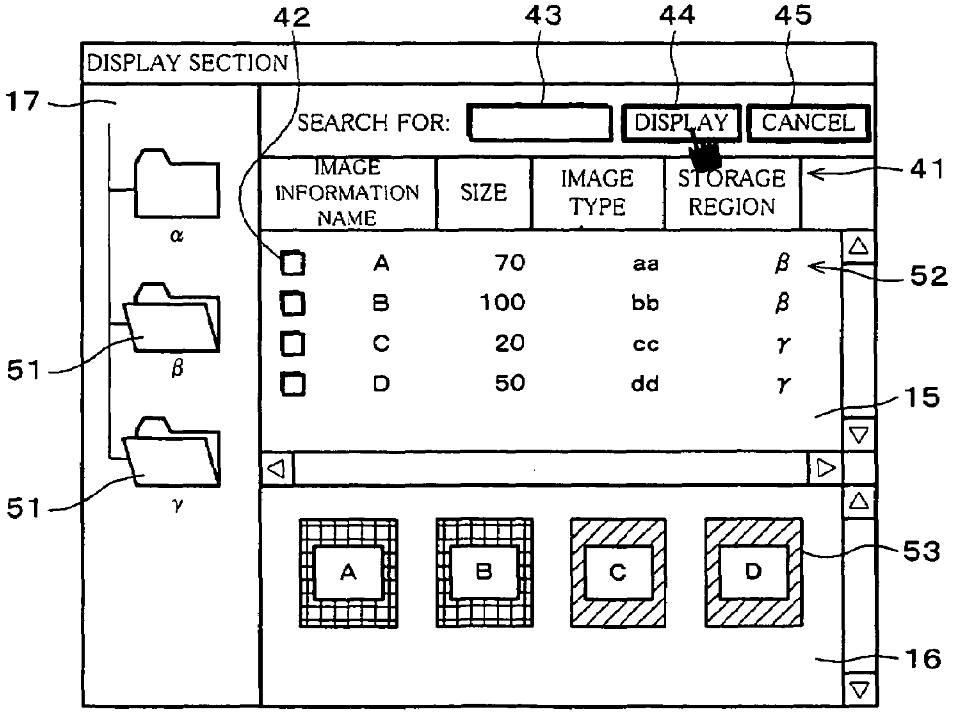

Alternatively, folders 51 can be selected by selecting those folders 51 to be opened with the mouse in the input section 1 as shown in FIG. 33(*a*) and manipulating the display button 44 as shown in FIG. 33(*b*), the detailed information 52 and scaled-down images 53 of the image information in the selected folders 51 are displayed in the detailed information display area 15 and the scaled-down image display area 16 respectively.

The scaled-down image 53 is not limited in any particular manner, as long as it enables the user to identify the image information stored in the folder 51. Examples include a scaled-down image representing a page of text data as shown in FIG. 34(*a*), a scaled-down image representing a page of image data as shown in FIG. 34(*b*), a scaled-down image representing a page of mixed text and image data, and a scaled-down image representing more than one pages of image information (either text data or image data, or mixed text and image data) as shown in FIG. 34(*c*).

Figure 34C:
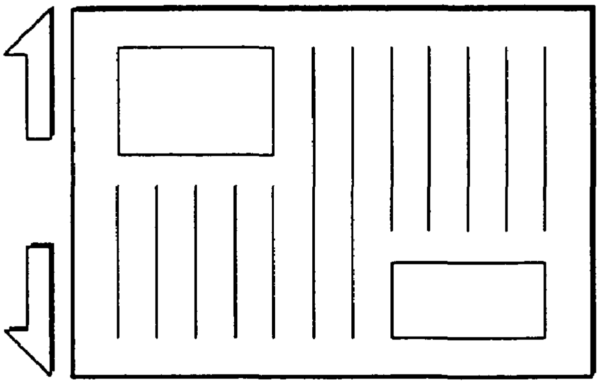
FIG. 34(*a*) is an explanatory view showing an example of the scaled-down image of FIG. 6.
Figure 34B:
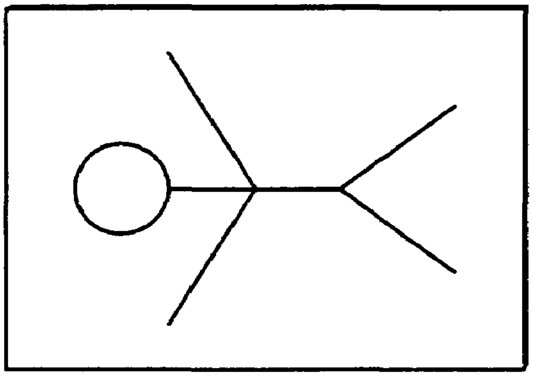
Figure 34A:
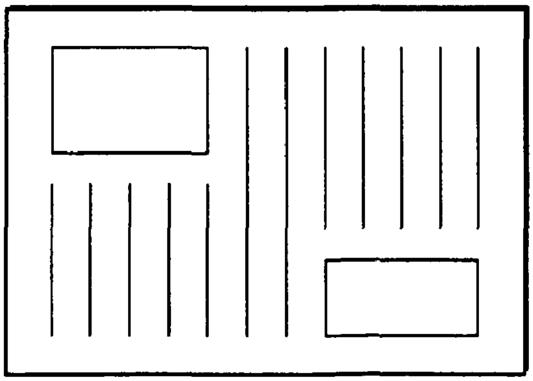

The images shown in FIGS. 34(*a*) and 34(*b*) are scaled-down images of the original with no other changes at all, each representing a page of image information (text data, image data), while retaining a satisfactory level of visual recognizability. The image shown in FIG. 34(*c*) is a scaled-down image of the original including multiple pages with no other changes at all, representing only one of the pages, while retaining a satisfactory level of visual recognizability. Two arrow icons, for example, are provided on top of this scaled-down image, thereby offering a function to sequentially display desired scaled-down images of the image information through manipulation of them.

Throughout the foregoing examples, the scaled-down image 53 has been used as an identifier image of the image information; however, the identifier image is neither limited to the scaled-down image 53 nor in any particular manner, as long as it enables the user to identify at least a part of the image information. An alternative example shows a part of the image information, for instance, a characteristic part of the image information.

Figure 35:
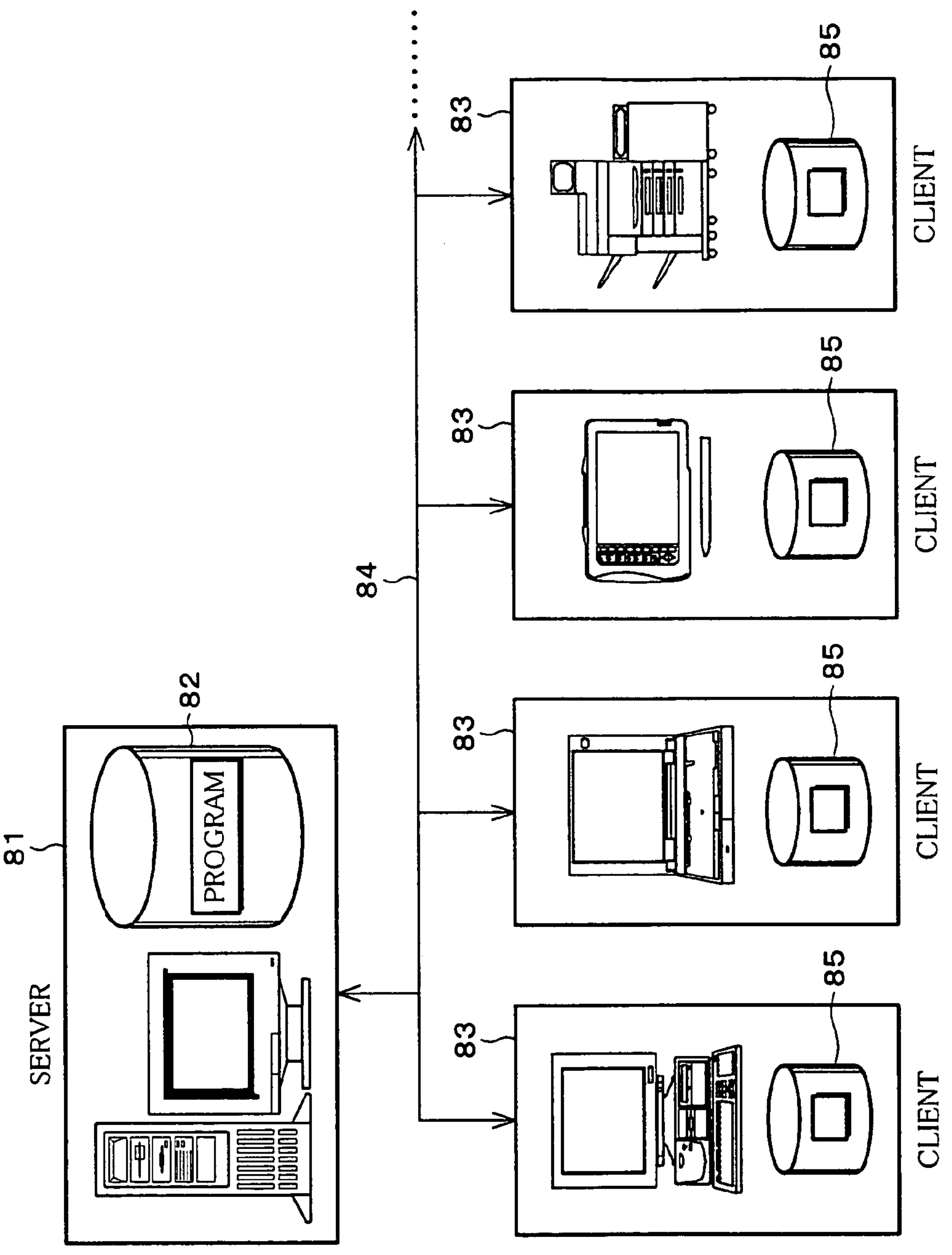
FIG. 35 is a block diagram showing an arrangement for transmitting a computer program for an image information processing device of the present embodiment.

The computer program for the present image information processing device can be transmitted by, for example, the configuration shown in FIG. 35 where a file in execute form written as a computer program is stored in a hard disk or other recording medium 82 in the host server 81. The host server 81 is connected to multiple user terminals 83 via Ethernet cable, telephone line, or other transmission medium 84 and is operable using TCP/IP protocol. A file in execute form is transmitted from the host server 81 to a user terminal 83 in response to a transmission request from the user terminal 83.

The file in execute form thus transmitted is stored in a recording medium 85 in the user terminal 83, available for use by the user. In this manner, the various processes presented in the embodiments become executable in any given user terminal 83.

As described in the foregoing, in the present image information processing device, the detailed information 52 and scaled-down images 53 are displayed simultaneously in a at-a-glance format. If a rearrange process is executed on either the detailed information 52 or the scaled-down images 53, the rest is also rearranged as interlinked with the process. Therefore, even when either the detailed information 52 or the scaled-down images 53 are rearranged, the relationship between them is visually represented clearly, realizing a convenient image information processing device.

As explained in the foregoing, the image information processing device and image information processing method are realized by programs to execute the various processes. The programs are stored in a recording medium accessible by the computer. In the present invention, the recording medium may be a program medium itself, for example, memory or ROM needed in a micro computer to execute the processes or may be a program medium that is readable by inserting recording media in a program reader provided as an external memory device.

In either case, the stored programs may be accessible and executable by a micro processor. Alternatively, in either case, the program may be read and downloaded to a program memory area (not shown) in the micro computer before being executed. In the latter event, the program is stored in advance in a main device, available for download.

The program medium is a recording medium arranged so as to be detachable from the main device and may be a medium holding programs substantially permanently, including a tape, such as magnetic tape and cassette tape; a magnetic disk, such as a floppy disk and a hard disk; an optical disk, such as a CD-ROM, MO, MD, and DVD; a card, such as an IC (memory) card and optical card; and semiconductor memory, such as masked ROM, EPROM, EEPROM, flash ROM.

In addition, the system in the present invention is arranged to allow connection to the Internet and other communications networks. Therefore, the program medium may be a one that holds programs in an ad hoc manner like downloading programs over a communications network. Note if the program is to be downloaded over a communications network, the program may be stored in advance in the main device, available for download, or installed from another recording medium. The contents stored in the recording medium are not limited to a program; alternatively, they may be data.

An image information processing device in accordance with the present invention includes:

hierarchical structure display means for displaying a relationship between storage region (directory) groups having a hierarchical structure;

detailed information display means for displaying by list sets of detailed information about a plurality of sets of image information stored in one of the storage region groups;

scaled-down image display means for displaying scaled-down images of the image information;

simultaneous display control means for effecting an at-a-glance display on the displays effected by the detailed information display means and the scaled-down image display means simultaneously; and interlinked display control means for interlinking manipulation on, and thereby displaying, the detailed information about the image information and the scaled-down images corresponding to the detailed information.

This effects such a display on a single display section that a plurality of sets of image information are identifiable by means of scaled-down images and recognizable at a glance by the use of a list and thereby enables the user to manipulate image information while looking at both display sections as required by the circumstances.

As explained in the foregoing, an image information processing device in accordance with the present invention may include a management table, in which a common display order between the detailed information and the identifier images is set, for each set of image information stored in the image information storage region, wherein the interlinked display control means rewrites the display order in the management table in line with the preceding change in one of the display orders and changes the other display order effected by the display means in line with the rewritten display order.

In the arrangement, the interlinked display control means rewrites the display order in the management table in line with the preceding change in one of the display orders and changes the display order effected by the display means in line with the rewritten display order. Therefore, the display orders of the detailed information and the identifier images can be change readily and accurately by means of management tables.

The image information processing device may be such that the detailed information includes a plurality of items about this information and that the device further includes item-specific rearrange means for rearranging the display order of the sets of detailed information on the display screen of the display means according to information shown by the plurality of items.

In the arrangement, the item-specific rearrange means can change the display order of the sets of detailed information according to the information shown by any of the plurality of items in the detailed information. In other words, when the detailed information includes, for example, such an item showing the sizes of sets of image information, the sets of detailed information can be rearranged according to the size of the set of image information, for example, in descending or ascending order by size. This further enhances the operability.

The image information processing device may further includes input means, wherein the display control means includes extract display control means for extracting at least one of the identifier images according to an input from the input means and causing the display means to display the extracted identifier image.

In the arrangement, the extract display control means extracts an identifier image according to an input from the input means and causes the display means to display the extracted identifier image. In other words, the display means displays the identifier image selected by the operator. This enables the user to easily find the identifier image on the display screen of the display means and thereby further enhances the operability.

The image information processing device may further includes input means, wherein the display control means includes extract display control means for extracting detailed information according to an input from the input means, setting detailed information not extracted in this extract operation to a non-selectable state, and causing the display means to effect a non-selectable display representing this state.

In the arrangement, the extract display control means sets the detailed information not extracted in the extract operation executed on the detailed information according to an input from the input means to a non-selectable state and causes the display means to effect a non-selectable display representing this state.

This renders the result of extracting the detailed information visually recognizable and further enhances the operability.

The image information processing device may be such that the extract display control means causes the detailed information extracted in the extract operation to be displayed in or near a first position in the row showing the detailed information and the detailed information not extracted to be displayed in or near a last position in the row showing the detailed information.

In the arrangement, the extract display control means causes the detailed information extracted in the extract operation executed on the detailed information according to an input from the input means to be displayed in or near a first position in the row showing the detailed information and the detailed information not extracted to be displayed in or near a last position in the row showing the detailed information. This renders the result of extracting the detailed information visually recognizable and further enhances the operability.

The image information processing device may be such that the extract display control means includes direct select means for enabling the detailed information displayed by the display control means to be selected by means of the input means, so as to select at least either the detailed information or identifier image to be extracted.

In the arrangement, the direct select means enables the operator to readily perform a select operation on the detailed information to be extracted.

The image information processing device may be such that the extract display control means includes search means for extracting at least either the detailed information or identifier image to be extracted according to search conditions entered through the input means.

In the arrangement, the search means enables the operator to readily perform a select operation on the detailed information to be extracted.

The image information processing device may be such that the image information storage means has a plurality of image information storage regions, and the display control means includes combined display control means for causing the display means to display in combination the sets of detailed information and identifier images of the plurality of sets of image information stored in the plurality of image information storage regions.

In the arrangement, the combined display control means causes the display means to display in combination the sets of detailed information and identifier images of the plurality of sets of image information stored in a plurality of image information storage regions. This effects such an at-a-glance display of the sets of detailed information and identifier images of the plurality of sets of image information stored in a plurality of image information storage regions on a single display section and thereby further enhances the operability.

The image information processing device further may include display area providing means, provided in the display means, for providing display areas for the detailed information and the identifier images, wherein the display control means causes the detailed information to be displayed in a detailed information display area and the identifier images to be displayed in an identifier image display area.

In the arrangement, the detailed information and the identifier images are displayed in the detailed information display area and the identifier image display area respectively.

The image information processing device may be such that the identifier image is a scaled-down image of the image information.

In the arrangement, the identifier image is a scaled-down image of the image information, which facilitates recognition and identification of the contents of image information by means of the identifier image. This further improves the convenience in using the image information processing device.

An image information processing method in accordance with the present invention includes:

the detailed information and identifier image display step of causing display means to display sets of detailed information and identifier images of a plurality of sets of image information stored in an image information storage region, by which identifier images at least parts of the plurality of sets of image information are identified; and the interlinked display steps of, when a display order of either the detailed information or the identifier images is changed on a display screen of the display means, setting a display order of the other so that the detailed information and identifier images of the plurality of sets of image information are displayed in an identical display order in rows showing the detailed information and the identifier information respectively.

In the arrangement, the detailed information and identifier image display step causes display means to display sets of detailed information and identifier images of a plurality of sets of image information stored in an image information storage region. Under these circumstances, when a display order of either the detailed information or the identifier images is changed on a display screen of the display means by, for example, a drag-and-drop, the interlinked display step sets a display order of the other so that the detailed information and identifier images of the plurality of sets of image information are displayed in an identical display order.

As described above, the display means effects a at-a-glance display of the detailed information and identifier image of the image information stored in the image information storage region, which facilitates recognition of the contents of the image information. Further, if under these circumstances, the display order is changed, for example, of any kind of the detailed information, the display order of the identifier images is automatically changed according to the change. In other words, a change made to the display order of the detailed information is automatically reflected in the display order of the identifier images. Therefore, if the display order of either the detailed information or the identifier images is changed as desired by the user, the relationship between the detailed information and identifier images can be maintained without the user bothering to manipulate to change the display order of the other in line with the preceding change on the display screen. This enhances the operability in displaying information about the image information.

The image information processing method may be such that a management table, in which a common display order between the detailed information and the identifier images is set, is provided for each set of image information stored in the image information storage region, and in the interlinked display step, the display order in the management table is rewritten in line with the preceding change in one of the display orders, and the other display order effected by the display means is changed in line with the rewritten display order.

In the arrangement, the interlinked display step rewrites the display order set in the management table in line with the preceding change in one of the display orders and changes the display order effected by the display means in line with the rewritten display order. Therefore, the display orders of the detailed information and the identifier images can be change readily and accurately by means of management tables.

The image information processing method may be such that the detailed information includes a plurality of items about this information, said method further comprising the item-specific rearrange step of rearranging the display order of the sets of detailed information on the display screen of the display means according to information shown by the plurality of items.

In the arrangement, the item-specific rearrange step enables the display order of the sets of detailed information to be changed according to information shown by one of the plurality of items of the detailed information. In other words, when the detailed information includes, for example, such an item showing the sizes of sets of image information, the sets of detailed information can be rearranged according to the size of the set of image information, for example, in descending or ascending order by size. This further enhances the operability.

The image information processing method may be such that the detailed information and identifier image display step includes the extract display step of extracting at least one of the identifier images and causing the display means to display the extracted identifier image.

In the arrangement, the extract display control step extracts an identifier image and causes the display means to display the extracted identifier image. In other words, the display means displays the identifier image selected by the operator. This enables the user to easily find the identifier image on the display screen of the display means and thereby further enhances the operability.

The image information processing method may be such that the detailed information and identifier image display step includes the extract display step of extracting the detailed information, setting detailed information not extracted in this extract operation to a non-selectable state, and causing the display means to effect a non-selectable display representing this state.

In the arrangement, the extract display step sets the detailed information not extracted in the extract operation executed on the detailed information to a non-selectable state and causes the display means to effect a non-selectable display representing this state.

This renders the result of extracting the detailed information visually recognizable and further enhances the operability.

The image information processing method may be such that the extract display step causes the detailed information extracted in the extract operation to be displayed in or near a first position in the row showing the detailed information and the detailed information not extracted to be displayed in or near a last position in the row showing the detailed information.

In the arrangement, the extract display step causes the detailed information extracted in the extract operation executed on the detailed information to be displayed in or near a first position in the row showing the detailed information and the detailed information not extracted to be displayed in or near a last position in the row showing the detailed information. This renders the result of extracting the detailed information visually recognizable and further enhances the operability.

The image information processing method may be such that the extract display step includes the direct select step of enabling the detailed information displayed by the detailed information and identifier image display step to be selected directly, so as to select at least either detailed information or an identifier image to be extracted.

In the arrangement, the direct select enables the operator to readily perform a select operation on the detailed information to be extracted.

The image information processing method may be such that the extract display step includes the search step of extracting either the detailed information and at least one of the identifier images according to search conditions entered.

In the arrangement, the search step enables the operator to readily perform a select operation on the detailed information to be extracted.

The image information processing method may be such that the detailed information and identifier image display step includes the combined display step of causing the display means to display in combination the sets of detailed information and identifier images of the plurality of sets of image information stored in a plurality of image information storage regions.

In the arrangement, the combined display step causes the display means to display in combination the sets of detailed information and identifier images of the plurality of sets of image information stored in a plurality of image information storage regions. This effects such an at-a-glance display of the sets of detailed information and identifier images of the plurality of sets of image information stored in a plurality of image information storage regions on a single display section and thereby further enhances the operability.

The image information processing method may be such that the display means further includes the step of providing display areas for the detailed information and the identifier images, and the detailed information and identifier image display step causes the detailed information to be displayed in a detailed information display area and the identifier images to be displayed in an identifier image display area.

In the arrangement, the detailed information and the identifier images are displayed in the detailed information display area and the identifier image display area respectively.

The image information processing method may be such that the identifier image is a scaled-down image of the image information.

In the arrangement, the identifier image is a scaled-down image of the image information, which facilitates recognition and identification of the contents of image information by means of the identifier image. This further improves the convenience in using the image information processing device.

A recording medium in accordance with the present invention readable by a computer can store a program causing a computer to execute:

the detailed information and identifier image display process of causing display means to display sets of detailed information and identifier images of a plurality of sets of image information stored in an image information storage region, by which identifier images at least parts of the plurality of sets of image information are identified; and the interlinked display process of, when a display order of either the detailed information or the identifier images is changed on a display screen of the display means, setting a display order of the other so that the detailed information and identifier images of the plurality of sets of image information are displayed in an identical display order in rows showing the detailed information and the identifier information respectively.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An image information processing device, comprising:

a display;

an image information storage;

a display controller for causing the display to display sets of detailed information and identifier images of a plurality of sets of image information stored in an image information storage region in the image information storage, in which the identifier images identify at least parts of the plurality of sets of image information; and an interlinked display controller for, when a display order of either the detailed information or the identifier images is changed on a display screen of the display, setting a display order of the other so that the detailed information and identifier images of the plurality of sets of image information are displayed in an identical display order in rows showing the detailed information and the identifier information respectively;

further comprising an input device, wherein:

the display controller includes an extract display controller for extracting detailed information according to an input from the input device, setting detailed information not extracted to a non-selectable state, and causing the display to effect a non-selectable display representing said state, the extract display controller causes the display to display the detailed information extracted, in such a manner that the detailed information extracted is visually more recognizable than the detailed information not extracted;

the image information storage has a plurality of image information storage regions;

the display controller includes a combined display controller for causing the display to display in combination the sets of detailed information and identifier images of the plurality of sets of image information stored in the plurality of image information storage regions; and the set of detailed information and identifier images are respectively displayed in different display areas.

2. The image information processing device as defined in claim 1, wherein:

a management table, in which a common display order between the detailed information and the identifier images is set, is included for each set of image information stored in the image information storage region; and the interlinked display controller rewrites the display order in the management table in accordance with a preceding change in one of the display orders and changes the other display order effected by the display in accordance with the rewritten display order.

3. The image information processing device as defined in claim 1, wherein the detailed information includes a plurality of items about this information, said device further comprising an item-specific rearranger for rearranging the display order of the sets of detailed information on the display screen of the display according to information shown by the plurality of items.

4. The image information processing device as defined in claim 1, further comprising an input device, wherein:

the display controller includes an extract display controller for extracting at least one of the identifier images according to an input from the input device and causing the display to display the extracted identifier image.

5. The image information processing device as defined in claim 4, wherein:

the extract display controller includes a direct selector for enabling the detailed information displayed by the display controller to be selected by the input device, so as to select an identifier image to be extracted.

6. The image information processing device as defined in claim 4, wherein:

the extract display controller includes a search process for extracting at least one of the identifier images according to search conditions entered through the input device.

7. The image information processing device as defined in claim 1, wherein:

the extract display controller causes the detailed information extracted to be displayed in or near a first position in a row showing the detailed information and the detailed information not extracted to be displayed in or near a last position in the row showing the detailed information.

8. The image information processing device as defined in claim 1, wherein: the extract display controller includes a direct selector for enabling the detailed information displayed by the display controller to be selected by the input device, so as to select detailed information to be extracted.

9. The image information processing device as defined in claim 1, wherein:

the extract display controller includes a search process for extracting detailed information according to search conditions entered through the input device.

10. The image information processing device as defined in claim 1, wherein:

the combined display controller causes the identifier images of the image information stored in different image information storage regions to be displayed in different colors, wherein each different color corresponds to a particular image information storage region.

11. The image information processing device as defined in claim 1, wherein:

the detailed information to be displayed includes identifier information by which the image information storage region where the image information is originally stored can be identified.

12. The image information processing device as defined in claim 1, further comprising a display area in the display for providing display areas for the detailed information and the identifier images, wherein:

the display controller causes the detailed information to be displayed in a detailed information display area and the identifier images to be displayed in an identifier image display area.

13. The image information processing device as defined in claim 1, wherein:

the identifier image is a scaled-down image of the image information.

14. An image information processing method, comprising:

a detailed information and identifier image display step of causing a display to display sets of detailed information and identifier images of a plurality of sets of image information stored in an image information storage region, in which identifier images identify at least parts of the plurality of sets of image information;

an interlinked display step of:

when a display order of either the detailed information or the identifier images is changed on a display screen of the display, setting a display order of the other so that the detailed information and identifier images of the plurality of sets of image information are displayed in an identical display order in rows showing the detailed information and the identifier information respectively, wherein the detailed information and identifier image display step further includes extract display steps of extracting the detailed information, setting detailed information not extracted to a non-selectable state, and causing the display to effect a non-selectable display representing said state, and wherein the extract display steps cause the display to display the detailed information extracted in such a manner that the detailed information extracted is visually more recognizable than the detailed information not extracted;

storing the plurality of sets of image information in a plurality of image information storage regions;

causing the display to display in combination the sets of detailed information and identifier images of the plurality of sets of image information stored in the plurality of image information storage regions; and causing the set of detailed information and identifier images to be respectively displayed in different display areas.

15. The image information processing method as defined in claim 14, wherein:

a management table, in which a common display order between the detailed information and the identifier images is set, is provided for each set of image information stored in the image information storage region; and in the interlinked display step, the display order in the management table is rewritten in accordance with a preceding change in one of the display orders, and the other display order effected by the display is changed in accordance with the rewritten display order.

16. The image information processing method as defined in claim 14, wherein the detailed information includes a plurality of items about this information, said method further comprising an item-specific rearrange step of rearranging the display order of the sets of detailed information on the display screen of the display according to information shown by the plurality of items.

17. The image information processing method as defined in claim 14, wherein:

the detailed information and identifier image display step includes an extract display step of extracting at least one of the identifier images and causing the display to display the extracted identifier image.

18. The image information processing method as defined in claim 17, wherein:

the extract display step includes a direct select step of enabling the detailed information displayed by the detailed information and identifier image display step to be directly selected, so as to select an identifier image to be extracted.

19. The image information processing method as defined in claim 17, wherein:

the extract display step includes a search step of extracting at least one of the identifier images according to search conditions entered.

20. The image information processing method as defined in claim 14, wherein:

the extract display step causes the detailed information extracted to be displayed in or near a first position in a row showing the detailed information and the detailed information not extracted to be displayed in or near a last position in the row showing the detailed information.

21. The image information processing method as defined in claim 14, wherein:

the extract display step includes a direct select step of enabling the detailed information displayed by the detailed information and identifier image display step to be selected directly, so as to select detailed information to be extracted.

22. The image information processing method as defined in claim 14, wherein:

the extract display step includes a search step of extracting the detailed information according to search conditions entered.

23. The image information processing method as defined in claim 14, wherein:

the detailed information and identifier image display step includes the combined display step of causing the display to display in combination the sets of detailed information and identifier images of the plurality of sets of image information stored in a plurality of image information storage regions.

24. The image information processing method as defined in claim 14, wherein:

the display further includes the step of providing display areas for the detailed information and the identifier images; and the detailed information and identifier image display step causes the detailed information to be displayed in a detailed information display area and the identifier images to be displayed in an identifier image display area.

25. The image information processing method as defined in claim 14, wherein:

the identifier image is a scaled-down image of the image information.

26. The image information processing method as defined in claim 14, wherein the detailed information and identifier image display step further includes:

causing the identifier images of image information stored in different information storage regions to be displayed in different colors, wherein each color corresponds to a particular image information storage region.

27. A computer readable storage medium storing an executable program causing a computer to execute:

a detailed information and identifier image display process of causing a display to display sets of detailed information and identifier images of a plurality of sets of image information stored in an image information storage region, in which identifier images identify at least parts of the plurality of sets of image information;

an interlinked display process of, when a display order of either the detailed information or the identifier images is changed on a display screen of the display, setting a display order of the other so that the detailed information and identifier images of the plurality of sets of image information are displayed in an identical display order in rows showing the detailed information and the identifier information respectively;

wherein the detailed information and identifier image display process includes an extract display process of extracting the detailed information, setting detailed information not extracted to a non-selectable state and causing the display to effect a non-selectable display representing said state, wherein the display is caused to display the detailed information extracted in such a manner that the detailed information extracted is visually more recognizable than the detailed information not extracted; and wherein the executable program further causes:

storing the plurality of sets of image information in a plurality of image information storage regions;

causing the display to display in combination the sets of detailed information and identifier images of the plurality of sets of image information stored in the plurality of image information storage regions; and causing the set of detailed information and identifier images to be respectively displayed in different display areas.

28. The computer readable medium of claim 27, wherein the executable program stored thereon for providing a detailed information and identifier image display process further causes:

causing the identifier images of image information stored in different information storage regions to be displayed in different colors, wherein each color corresponds to a particular image information storage region.

* * * * *